United States Patent
Nishio et al.

(10) Patent No.: US 10,464,399 B2
(45) Date of Patent: Nov. 5, 2019

(54) VEHICLE WINDOW OPENING DEVICE

(71) Applicant: ASMO CO., LTD., Shizuoka-ken (JP)

(72) Inventors: Daisuke Nishio, Kosai (JP); Tomohiko Kawaguchi, Toyohashi (JP); Masaru Kubota, Toyohashi (JP); Yutaka Naito, Toyohashi (JP)

(73) Assignee: Denso Corporation, Kariya (JP)

( * ) Notice: Subject to any disclaimer, the term of this patent is extended or adjusted under 35 U.S.C. 154(b) by 802 days.

(21) Appl. No.: 15/009,322

(22) Filed: Jan. 28, 2016

(65) Prior Publication Data

US 2016/0222712 A1 Aug. 4, 2016

(30) Foreign Application Priority Data

Jan. 30, 2015 (JP) .................. 2015-017247
Feb. 2, 2015 (JP) .................. 2015-018448

(Continued)

(51) Int. Cl.
*B60J 1/08* (2006.01)
*E05F 15/41* (2015.01)

(52) U.S. Cl.
CPC .................. *B60J 1/08* (2013.01); *E05F 15/41* (2015.01); *E05Y 2400/32* (2013.01);
(Continued)

(58) Field of Classification Search
CPC .... E05Y 2900/55; E05F 15/695; E05F 15/73; E05F 15/40; B60W 10/06
See application file for complete search history.

(56) References Cited

U.S. PATENT DOCUMENTS

2007/0003258 A1* 1/2007 Franzan ............... H02H 7/0851
388/803
2010/0083579 A1* 4/2010 Kigoshi ............. G05B 19/4061
49/358

(Continued)

FOREIGN PATENT DOCUMENTS

JP 2002-256766 A 9/2002
JP 2010144379 A 1/2010
(Continued)

OTHER PUBLICATIONS

Japanese Office Action for Application No. 2015-017247 dated Apr. 12, 2018, (3 pages) and English Machine Translation (3 pages)(6 pages total).

(Continued)

*Primary Examiner* — Shawki S Ismail
*Assistant Examiner* — Zoheb S Imtiaz
(74) *Attorney, Agent, or Firm* — Patterson Thuente Pedersen, P.A.

(57) ABSTRACT

A vehicle window opening device includes a controller, a change detector, and a drawing detector. The controller configured to control opening and closing of a vehicle window based on a drive force of a motor. The change detector is configured to detect a change in a state of movement of the vehicle window. A drawing detector is configured to detect drawing of a foreign matter by the vehicle window based on a change detected by the change detector. The controller is configured to restrict opening of the vehicle window after the drawing detection.

15 Claims, 11 Drawing Sheets

(30) Foreign Application Priority Data

Feb. 3, 2015 (JP) .................................. 2015-019635
Feb. 26, 2015 (JP) .................................. 2015-037142

(52) U.S. Cl.
CPC ..... *E05Y 2400/36* (2013.01); *E05Y 2400/456* (2013.01); *E05Y 2900/55* (2013.01)

(56) References Cited

U.S. PATENT DOCUMENTS

| | | | |
|---|---|---|---|
| 2013/0276748 A1* | 10/2013 | Kromer | H02H 7/0851 123/319 |
| 2013/0340341 A1 | 12/2013 | Shibata | |
| 2014/0083011 A1 | 3/2014 | Sumiya | |
| 2014/0207343 A1* | 7/2014 | Kigoshi | E05F 15/40 701/49 |

FOREIGN PATENT DOCUMENTS

| | | | |
|---|---|---|---|
| JP | 2011122369 A | 6/2011 | |
| JP | 2014-040769 A | 3/2014 | |
| JP | 2014-062411 A | 4/2014 | |

OTHER PUBLICATIONS

Japanese Office Action for Application No. 2015-037142, dated Jul. 24, 2018 (3 pgs).

* cited by examiner

VEHICLE WINDOW OPENING DEVICE

BACKGROUND OF THE INVENTION

The present invention relates to a vehicle window opening device such as a power window device that is installed in a vehicle.

A vehicle window opening device provided with a function for detecting a foreign matter that obstructs with the opening and closing of a vehicle window is known in the art. For example, Japanese Laid-Open Patent Publication No. 2011-122369 describes a vehicle window opening device (power window device) that refers to changes in the rotation speed of a motor, which serves as a drive source, to detect when movement of a vehicle window glass is obstructed by a foreign matter. The vehicle window opening device acts to reduce the load applied to the foreign matter by, for example, stopping the motor when detecting the foreign matter. This allows for the foreign matter to be prevented from being entrapped between the closing vehicle window and the window frame. Further, this allows for the foreign matter to be prevented from being drawn into, for example, the door by the opening vehicle window.

However, in a vehicle window opening device provided with the foreign matter detection function described above, after stopping the movement of the vehicle window when detecting that the vehicle window, which is opening (being lowered in a power window device), is drawing in a foreign matter, the window may be closed (raised) to release the drawn-in foreign matter. In such a case, the change in load caused by the drawn-in foreign matter may result in erroneous entrapment detection. When such erroneous entrapment detection occurs, movement of the vehicle window is reversed (opened) or stopped. This may hinder the releasing of the foreign matter.

Further, a known vehicle window closing device executes speed control so that the vehicle window is moved at a low speed in a low speed zone and a high speed in a high speed zone (for example, refer to Japanese Laid-Open Patent Publication No. 2010-144379).

In the vehicle window device described in Japanese Laid-Open Patent Publication No. 2010-144379, when stopping the motor upon detection of the drawing of a foreign matter, a switch is operated to close the vehicle window. However, when the foreign matter is drawn into the door, friction is produced between the vehicle window and the foreign matter. In this case, when the vehicle window is closed at a high speed, a load may suddenly be applied to the foreign matter.

Moreover, in the vehicle window opening device of Japanese Laid-Open Patent Publication No. 2011-122369, when the drawing of a foreign matter occurs, a door belt molding in a lower portion of the window frame may be drawn in together with the foreign matter. This may result in repetitive drawing of the door belt molding. Once repetitive drawing of the door belt molding starts, the drawing prevention function may always be activated at the same position even though only the door belt molding has been drawn into the door without any foreign matter. In this manner, repetitive drawing of the door belt molding may adversely affect the foreign matter drawing detection performance.

SUMMARY OF THE INVENTION

It is an object of the present invention to provide a window opening device that releases a drawn-in foreign matter in a preferred manner.

To achieve the above object, a vehicle window opening device according to one aspect of the present invention includes a controller, a change detector, and a drawing detector. The controller is configured to control opening and closing of a vehicle window based on a drive force of a motor. The change detector is configured to detect a change in a state of movement of the vehicle window. The drawing detector is configured to detect drawing of a foreign matter by the vehicle window based on a change detected by the change detector. The controller is configured to restrict opening of the vehicle window after the drawing detection.

DETAILED DESCRIPTION OF THE PREFERRED EMBODIMENTS

A first embodiment in which a vehicle window opening device is embodied in a power window device will now be described.

Figure 1:
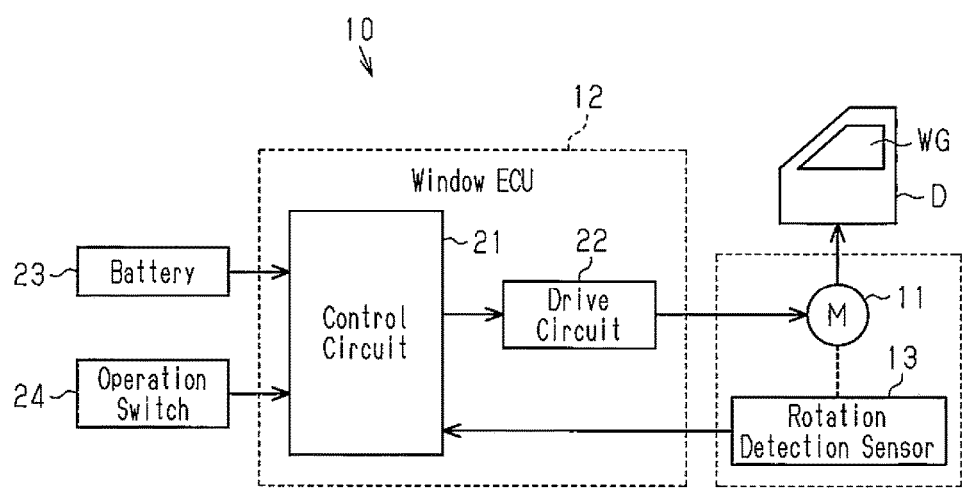
FIG. 1 is a schematic electric block diagram showing a power window device according to a first embodiment of the present invention.

As shown in FIG. 1, in the present embodiment, a power window device 10 (vehicle window opening device), which is coupled to a vehicle door D to open and close a window glass WG (vehicle window), includes a motor 11 and a window regulator (not shown), which is, for example, of an X-arm type and opens and closes the window glass WG when driven by the motor 11. The motor 11 includes a DC motor and a geared motor, which includes a reduction drive coupled integrally to the DC motor. The window regulator converts the rotation produced by the motor 11 to an opening or closing movement of the window glass WG.

The power window device 10 includes a window ECU 12, which controls the motor 11 to control the operation of the window glass WG, and a rotation detection sensor 13, which detects the rotation of the motor 11. The rotation detection sensor 13 is formed by, for example, a Hall IC and detects changes in a magnetic field when a sensor magnet (not shown), which is arranged on a rotation shaft of the motor 11, rotates to obtain rotation information such as the rotation speed and the rotation position of the motor 11.

The window ECU 12 is separate from the motor 11 or integrally incorporated in the motor 11. The window ECU 12 includes a control circuit 21 and a drive circuit 22. The drive circuit 22 supplies the motor 11 with power from an on-board battery 23 under the control of the control circuit 21. In the first embodiment, the control circuit 21 functions as a controller, a change detector, an entrapment detector, and a drawing detector.

The control circuit 21 drives the motor 11 with the drive circuit 22 when an operation switch 24, which is located on the vehicle door D, is operated to control the opening and closing of the window glass WG. The control circuit 21 obtains position information of the window glass WG from a rotation detection signal (pulse signal) output by the rotation detection sensor 13. In the present embodiment, the position information of the window glass WG is obtained by setting the fully closed position of the window glass WG as a reference (zero) and adding or subtracting the counted number of pulse edges (rising edge and falling edge) when the window glass WG opens or closes (i.e., motor 11 produces forward or reverse rotation). In this manner, the control circuit 21 calculates an open amount A from the fully closed position of the window glass WG.

The control circuit 21 obtains the rotation direction of the motor 11 from the rotation detection signal. Further, the control circuit 21 calculates the rotation speed of the motor 11 from the pulse interval (cycle) of the rotation detection signal. The control circuit 21 also calculates the amount of change in the speed of the motor 11 (speed change amount).

The control circuit 21 receives various command signals for opening or closing (raising or lowering) the window glass WG from the operation switch 24. The operation switch 24 is operated to open or close the window glass WG between the fully closed position and the fully open position. The operation switch 24 is a pivot-type switch or the like that is operable in two steps and includes an open switch, a close switch, and an auto switch.

More specifically, when the operation switch 24 is operated by one step toward one side, the open switch is activated. Thus, the operation switch 24 sends a manual open command signal to the control circuit 21 to manually open the window glass WG, that is, open the window glass WG while the operation switch 24 is being operated. When the operation switch 24 is operated by one step toward the other side, the close switch is activated. Thus, the operation switch 24 sends a manual close command signal to the control circuit 21 to manually close the window glass WG, that is, close the window glass WG while the operation switch 24 is being operated.

When the operation switch 24 is operated by two steps toward one side (automatic opening operation), the open switch and the auto-switch are both activated. Thus, the operation switch 24 sends an automatic open command signal to the control circuit 21 to automatically open the window glass WG, that is, open and move the window glass WG to the fully open position even after the operation switch 24 is released. When the operation switch 24 is operated by two steps toward the other side (automatic closing operation), the close switch and the auto-switch are both activated. Thus, the operation switch 24 sends an automatic close command signal to the control circuit 21 to automatically close the window glass WG, that is, close and move the window glass WG to the fully closed position even after the operation switch 24 is released.

When the control circuit 21 receives a manual open command signal or a manual close command signal from the operation switch 24, the control circuit 21 drives the motor 11 while the command signal is received (while operation switch 24 is operated) to manually open or manually close the window glass WG. When the control circuit receives an automatic open command signal or an automatic close command signal from the operation switch 24, the control circuit 21 drives the motor 11 to automatically move the window glass WG to the fully open position or the fully closed position.

The control circuit 21 is provided with a function for preventing entrapment between the window glass WG and the frame of the vehicle door D. In detail, the control circuit 21 compares a speed change amount of the motor 11 calculated from a rotation detection signal obtained when the window glass WG is closing (being raised) with an entrapment determination threshold value. When the speed change amount is greater than or equal to the entrapment determination threshold value, the control circuit 21 determines (detects) that a foreign matter has been entrapped by the window glass WG. Based on the entrapment determination, the control circuit 21 reversely moves the window glass WG for a predetermined amount in the open direction to release the foreign matter.

The control circuit 21 is also provided with a function for detecting the drawing of a foreign matter into the vehicle door D when opening (lowering) the window glass WG. In detail, the control circuit 21 compares a speed change amount of the motor 11 calculated from a rotation detection signal obtained when the window glass WG is opening with a drawing determination threshold value. When the speed change amount is greater than or equal to the drawing determination threshold value, the control circuit 21 determines (detects) that a foreign matter has been drawn in by the window glass WG. Based on the drawing determination, the control circuit 21 stops driving the motor 11 to stop opening the window glass WG.

Based on a drawing detection, the control circuit 21 invalidates the entrapment function and disables automatic closing of the window glass WG. In detail, when entrapment detection occurs, the control circuit 21 invalidates entrapment determination for subsequent closing of the window glass WG. That is, even if the speed change amount of the motor 11 when closing the window glass WG becomes greater than or equal to the entrapment determination threshold value, the control circuit 21 does not reverse the movement of the window glass WG in the open direction. Thus, movement of the window glass WG is not reversed by a change in load caused by the drawn-in foreign matter.

When a drawing detection occurs, the control circuit 21 invalidates automatic closing operations even if the operation switch 24 outputs an automatic close command signal when undergoing an automatic closing operation. Further, the control circuit 21 acknowledges the automatic close command signal as a manual close command signal. In this case, even when an automatic closing operation is performed on the operation switch 24, the window glass WG does not automatically close. However, manual closing is enabled regardless of a drawing detection. Here, the control circuit 21 compares the open amount A of the window glass WG with a limit threshold value N. When the open amount A is less than the limit threshold value N, a closing movement amount R1 is set to be smaller than a non-limited closing movement amount R0. For example, the movement amount R1 for a single closing movement is set to 5 mm. The limit threshold value N is set to, for example, a range from 100 to 150 mm. When the open amount A is greater than or equal to the limit threshold value N, a single closing movement amount is set to the movement amount R0. Subsequent to a drawing detection, if manual closing is continued when the open amount A is greater than or equal to the limit threshold value N, the motor 11 is stopped to stop closing the window glass WG when the open amount A becomes equal to a stop threshold value M or when the operation switch 24 is released. In the present embodiment, the stop threshold value M is equal to the limit threshold value N.

Further, when the window glass WG is located at the fully closed position or fully open position subsequent to a drawing detection, the control circuit 21 validates the entrapment prevention function and enables automatic closing.

One example of the operation of the power window device 10 will now be described.

The control circuit 21 of the power window device 10 in the present embodiment supplies power to the motor 11 via the drive circuit 22 to open or close the window glass WG in accordance with the operation (opening operation or closing operation) performed by a user on the operation switch 24. The control circuit 21 detects when a foreign matter is entrapped by the closing window glass WG. Further, the control circuit 21 detects when a foreign matter is drawn into the vehicle door D by the opening window glass WG.

Figure 2:
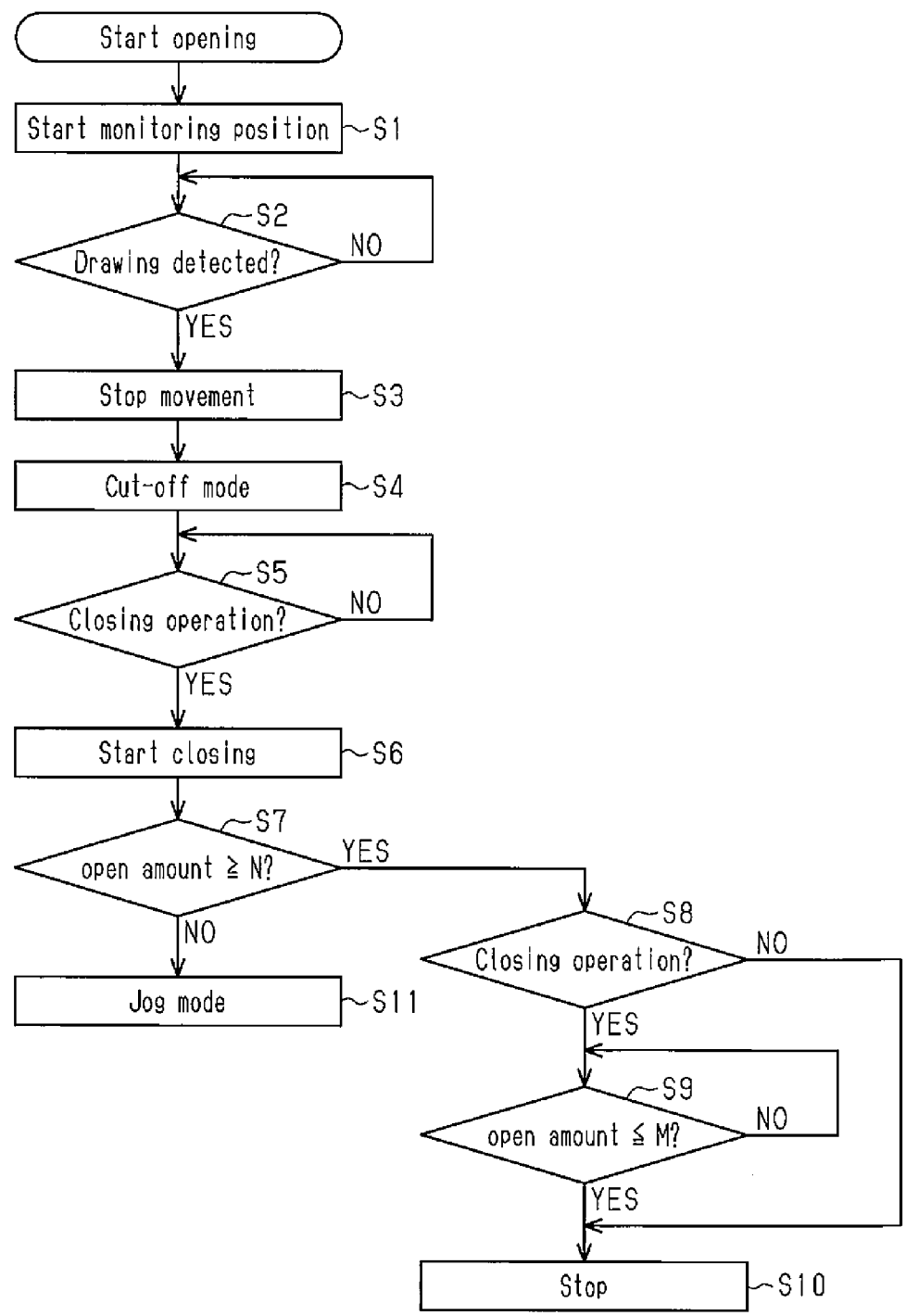
FIG. 2 is a flowchart illustrating the control executed by the power window device of FIG. 1.

The control of the first embodiment for detecting foreign matter that is drawn in during a closing movement will now be described with reference to FIG. 2.

When an opening movement (opening direction movement) starts, the control circuit 21 starts position monitoring (step S1). More specifically, the control circuit 21 counts the pulse edges in the rotation detection signal from the fully open position of the window glass WG, which is used as a reference (zero). The pulse edge counting allows for detection of the present open amount (position) of the window glass WG.

Then, the control circuit 21 detects for foreign matter drawn by the opening window glass WG (step S2).

Here, the control circuit 21 compares the speed change amount of the motor 11 with the drawing determination threshold value. When the speed change amount is less than the drawing determination threshold value, the control circuit 21 determines that the window glass WG is not drawing in a foreign matter (step S2: NO) and repeats step S2. Further, when the speed change amount is greater than or equal to the drawing determination threshold value, the control circuit 21 determines that the window glass WG has drawn in a foreign matter (step S2: YES) and stops driving the motor 11 to stop the opening window glass WG (step S3).

Then, the control circuit 21 drives the motor 11 and the like in a cut-off mode (step S4). In the cut-off mode, the control circuit 21 invalidates the entrapment prevention function and disables automatic opening of the window glass WG. Thus, when closing the window glass WG to release the drawn-in foreign matter subsequent to the drawing detection, the window glass WG is not reversed (opened) even when the drawn-in foreign matter changes the load and causes the characteristic value of the motor 11 to be greater than or equal to the determination threshold value. This allows the drawn-in foreign matter to be easily released. Further, automatic closing of the window glass WG is disabled when the entrapment prevention function is invalidated. This reduces unintentional entrapment caused by automatic closing.

Then, the control circuit 21 detects whether or not a closing operation has been performed (step S5). When a closing operation has been performed (step S5: YES), the control circuit 21 drives the motor 11 to close (move in closing direction) the window glass WG (step S6).

Subsequently, the control circuit 21 compares the present open amount A of the window glass WG with the limit threshold value N (step S7). The open amount A may be calculated from the counted number of pulse edges in the rotation detection signal using the fully open position as a reference (zero) as described above.

When the open amount A is greater than or equal to the limit threshold value N (step S7: YES), the control circuit 21 detects whether or not a closing operation is being continuously performed (step S8). When a closing operation has been completed (step S8: NO), the control circuit 21 stops driving the motor 11 and stops closing the window glass WG (step S10). When a closing operation is being continuously performed (step S8: YES), the control circuit 21 compares the present open amount A of the window glass WG with the stop threshold value M (step S9). As long as the open amount A is greater than the stop threshold value M (step S9: NO), the control circuit 21 continues closing the window glass WG. When the open amount A becomes less than or equal to the stop threshold value M (step S9: YES), the control circuit 21 stops driving the motor 11 to stop closing the window glass WG (step S10).

When the open amount A is less than the limit threshold value N (step S7: NO), the control circuit 21 controls the motor 11 and moves the window glass WG in a jog mode. In this case, the cut-off mode (step S4) is continued.

The jog mode restricts the closing movement amount when the operation switch 24 undergoes an operation (closing operation) that moves the window glass WG in the closing direction. The limited closing movement amount R1 is smaller than the non-limited closing movement amount R0 for a non-jog mode. The movement amount R1 is set to 5 mm. Under this situation, even when, for example, the operation switch 24 undergoes an automatic closing operation (two-step operation), the control circuit 21 acknowledges that a single manual closing operation has been performed and restricts the movement amount when closing the window glass WG.

The first embodiment has the advantages described below.

(1) After a drawing detection, the closing movement amount is limited when the open amount A of the window glass WG is not greater than or equal to the predetermined limit threshold value N. Thus, the movement amount is limited even when closing the window glass WG to release a drawn-in foreign matter. This reduces foreign matter entrapment. Further, window closing is performed although the movement amount is limited. This allows the foreign matter to be released.

(2) After a drawing detection, the control circuit 21 disables the entrapment prevention control so that the entrapment prevention control is not executed when the window glass WG is closing. Thus, when closing the vehicle window to release a drawn-in foreign matter subsequent to the drawing detection, the entrapment prevention control (stopping and reversing) is not executed. This allows the drawn-in foreign matter to be easily released.

(3) When the entrapment prevention control is disabled (invalidated), automatic closing of the vehicle window is disabled. This prevents entrapment of a foreign matter caused by automatic closing of the vehicle window when the entrapment prevention control is invalidated.

The first embodiment may be modified as described below.

Figure 3:
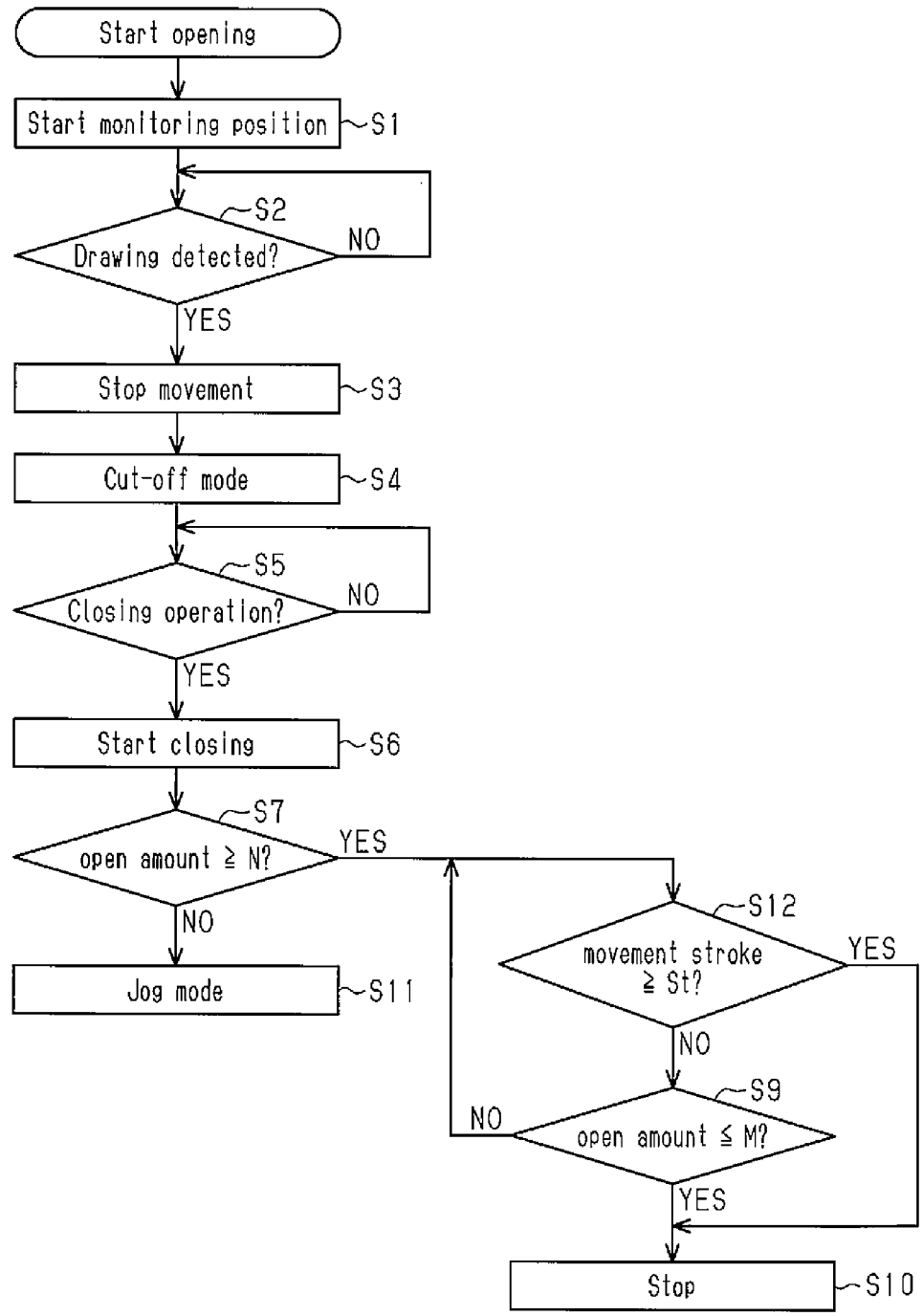
FIG. 3 is a flowchart illustrating the control executed by a power window device in a further example of the first embodiment.

In the first embodiment, when the open amount A of the window glass WG is greater than or equal to the limit threshold value N, the window glass WG is continuously closed until the open amount A becomes equal to the stop threshold value M. Instead, for example, as shown in FIG. 3, when the open amount A of the window glass WG is greater than or equal to the limit threshold value N (step S7: YES), the control circuit 21 may compare the subsequent closing movement amount (movement stroke) with a movement amount threshold value St (step S12).

Then, when the movement amount becomes greater than or equal to the movement amount threshold value St (step S12: YES), the control circuit 21 stops driving the motor 11 to stop closing the window glass WG (step S10). The movement amount threshold value St is set to, for example, 50 mm as the movement amount of the window glass WG.

When the movement amount is less than the movement amount threshold value St (step S12: NO), the control circuit 21 compares the present open amount A of the window glass WG with the stop threshold value M (step S9). When the open amount A is greater than the stop threshold value M (step S9: NO), the control circuit 21 repeats processing from step S12. That is, as long as the movement amount is less than the movement amount threshold value St and the open amount A is greater than the stop threshold value M, the closing of the window glass WG is continued. Further, when the open amount A becomes less than or equal to the stop threshold value M (step S9: YES), the control circuit 21 stops driving the motor 11 to stop closing the window glass WG (step S10).

As described above, by setting the threshold value St to allow for a larger single movement amount than the single movement amount R1 for the jog mode, foreign matter entrapment can be reduced while releasing a foreign matter more quickly than the jog mode.

Although not particularly mentioned in the first embodiment, the cut-off mode and the jog mode may be canceled when, for example, the window glass WG reaches the fully closed position or the fully open position.

In the first embodiment, the control circuit 21 performs foreign matter detection (entrapment and drawing detection) using the speed change amount of the motor 11. Instead, for example, foreign matter detection may be performed using a characteristic value other than the speed change amount of the motor 11 (characteristic value of motor 11 that changes in accordance with changes in load applied to window glass WG).

In the first embodiment, when determining entrapment, the control circuit 21 reverses and moves the window glass WG for a predetermined amount in the opening direction when entrapment is determined. Instead, for example, the motor 11 may be stopped when entrapment is determined. Further, in the first embodiment, the control circuit 21 stops driving the motor 11 when drawing is detected to stop opening the window glass WG. In addition, when drawing is detected, the control circuit 21 may reverse and move the window glass WG for a predetermined amount in the closing direction.

In the first embodiment, the control circuit 21 invalidates the entrapment determination when closing the window to invalidate the entrapment prevention function. Instead, for example, the control circuit 21 may stop performing the entrapment determination (i.e., stop comparing speed change amount of motor 11 with entrapment determination threshold value) to invalidate the entrapment prevention function.

In the first embodiment, the present invention is applied to the power window device 10 that uses the X-arm type window regulator. The present invention may also be applied to, for example, a power window device that uses a wire-type window regulator.

In the first embodiment, the present invention is applied to the power window device 10 that opens and closes the window glass WG of the vehicle door D. Instead, the present invention may be applied to, for example, a sunroof device that opens a roof glass of a vehicle roof.

The first embodiment and the modified examples of the first embodiment may be combined.

A technical concept that can be acknowledged from the first embodiment and the modified examples of the first embodiment will now be described.

(A) A vehicle window opening device further comprising a restriction cancellation unit, wherein the restriction cancellation unit is configured to cancel restriction of the entrapment prevention control executed by the restriction unit when the vehicle window is located at a fully closed position or a fully open position.

This configuration cancels restriction of the entrapment prevention control at the fully closed position of the fully open position.

A second embodiment in which a vehicle window opening device is embodied in a power window device will now be described. The power window device 10 of the second embodiment has the same configuration as the power window device 10 of the first embodiment shown in FIG. 1. The description will focus on differences from the first embodiment.

In the second embodiment, the control circuit 21 functions as a controller, a change detector, and a drawing detector. The control circuit 21 controls (changes) the voltage (output signal) applied to the motor 11 to control the speed of the motor 11 and the moving speed of the window glass WG.

Figure 4:
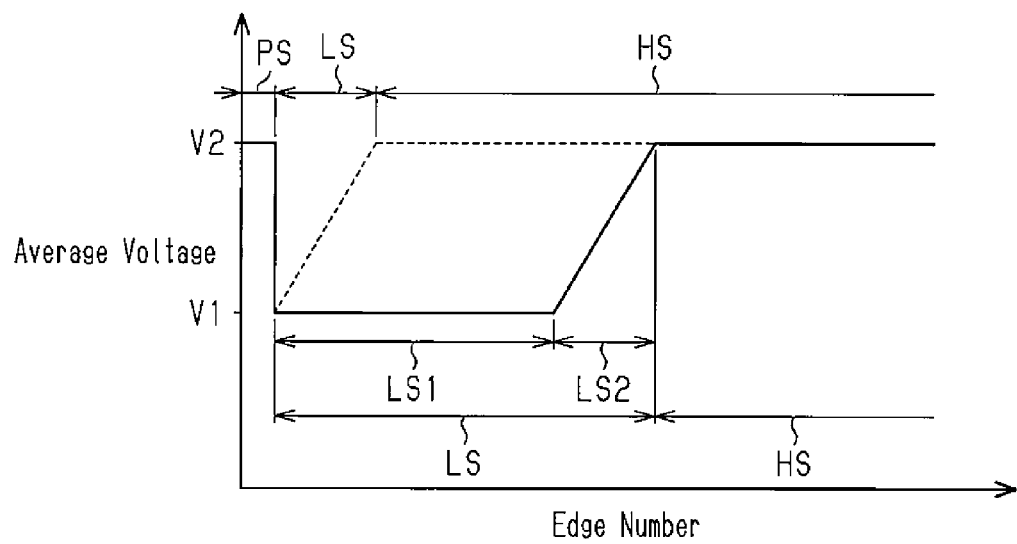
FIG. 4 is a graph illustrating speed control in a power window device according to a second embodiment of the present invention.

Referring to FIG. 4, the control circuit 21 executes a slow start control that moves the window glass WG at a low speed in a predetermined zone (low speed zone LS) immediately after the window glass WG starts to open and immediately after the window glass WG starts to close. Further, to eliminate backlash of the window regulator or the like before moving the window glass WG, the control circuit 21 sets a preparation zone PS in which the motor 11 is driven immediately before the low speed zone LS. In this manner, the window glass WG enters the preparation zone PS before moving, starts moving in the low speed zone LS, and then shifts to a normal speed zone HS. Further, in the present embodiment, the length of the low speed zone LS in the slow start control for the first closing movement subsequent to a drawing detection differs from that for other opening and closing movements. In the present embodiment, the slow start for the first closing movement subsequent to drawing detection is referred to as the first slow start, and the slow start for opening and closing movements other than the first closing movement subsequent to drawing detection is referred to as the second slow start.

In the normal speed zone HS, the control circuit 21 supplies the motor 11 with constant voltage V2 by setting the duty radio to a constant value (e.g., 100). This moves the window glass WG at a normal speed.

In the low speed zone LS, the control circuit 21 supplies the motor 11 with power (average voltage) obtained with a lower duty ratio than the constant value to move the window glass WG at a lower speed than the normal speed. More specifically, in the present embodiment, the low speed zone LS for the first slow start includes a constant speed zone LS1, in which the speed is constant in a predetermined zone from when movement starts, and a speed increasing zone LS2, in which the speed increases in conformance with a linear function after the constant speed zone LS1 ends. As shown in FIG. 4, in the constant speed zone LS1, the control circuit 21 controls the average voltage to be generally constant (voltage V1). Further, as shown in FIG. 4, in the speed increasing zone LS2, the control circuit 21 changes the duty ratio to gradually increase the average voltage from the voltage V1. The constant speed zone LS1 is set to have the lowest speed in the low speed zone LS. Further, in the speed increasing zone LS2, the voltage is controlled to substantially obtain the normal speed (voltage V2) immediately before shifting to the normal speed zone HS.

In the low speed zone LS for the second slow start, the speed increases in conformance with a linear function, and the voltage is controlled to substantially obtain the normal speed (voltage V2) immediately before shifting to the normal speed zone HS.

One example of the operation of the power window device 10 will now be described.

The control circuit 21 of the power window device 10 in the present embodiment supplies power to the motor 11 via the drive circuit 22 to open or close the window glass WG in accordance with the operation (opening operation or closing operation) performed by a user on the operation switch 24.

Further, the control circuit 21 detects when a foreign matter is drawn into the vehicle door D by the opening window glass WG. In the present embodiment, the closing speed differs in accordance with the number of movements subsequent to a drawing detection.

Figure 5:
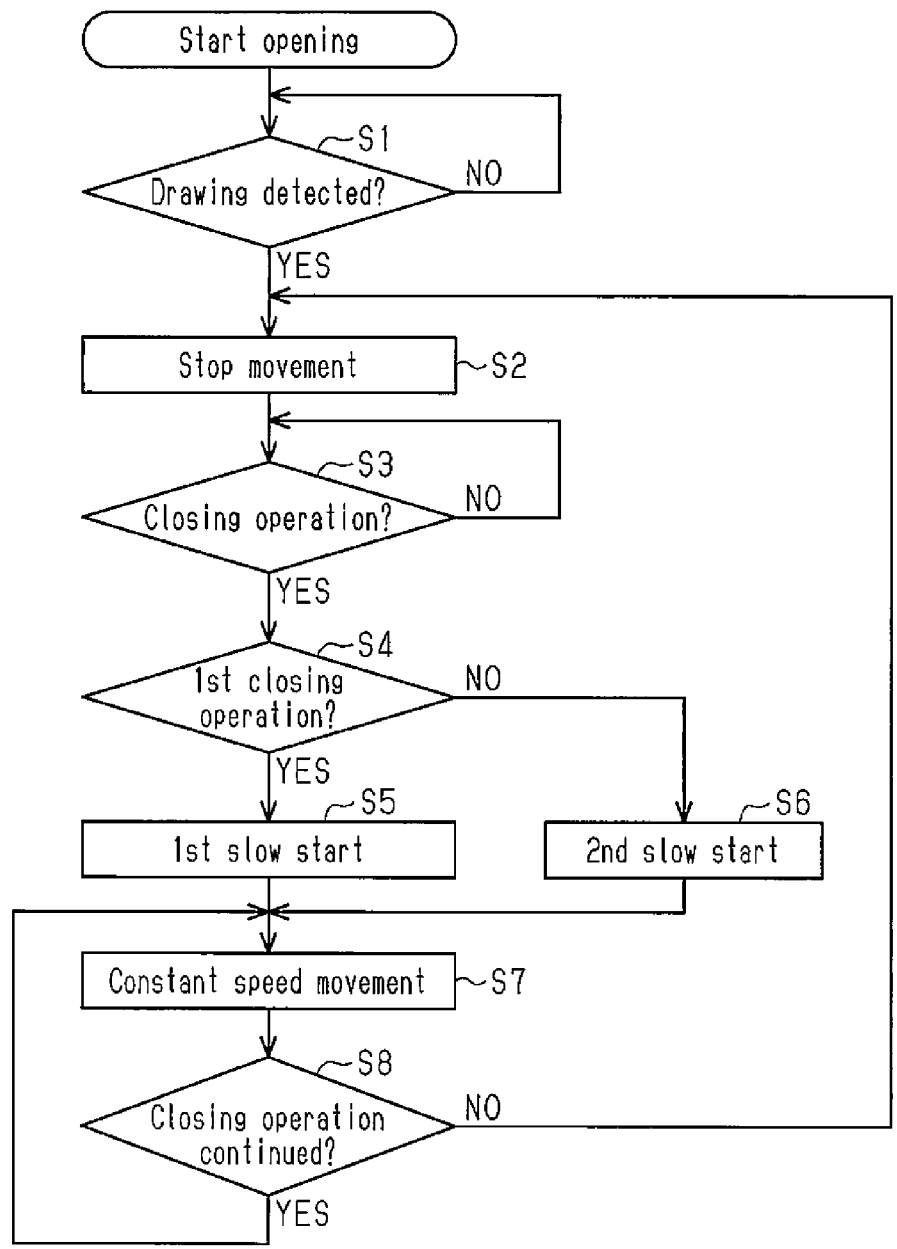
FIG. 5 is a flowchart illustrating the control executed by the power window device in the second embodiment.

The closing control that differs in accordance with the number of movements subsequent to a drawing detection will now be described with reference to FIG. 5.

When the control circuit 21 detects drawing during a closing movement (step S1: YES), the control circuit 21 stops driving the motor 11 and stops moving the window glass WG (step S2).

Then, the control circuit 21 detects whether or not a closing operation has been performed (step S3). When a closing operation is detected (step S3: YES), the control circuit 21 determines whether or not the closing operation is the first one after the drawing detection (step S4). In detail, for example, after the drawing detection, the control circuit 21 stores in a memory (not shown) the number performed operations whenever a closing operation is performed. In step S4, the control circuit 21 reads the number of operations stored in the memory. This allows the control circuit 21 to determine the number of times a closing operation has been performed. The number of operations stored in the memory may be initialized when drawing is detected (step S1: YES) to allow for correct measurement of the number of operations subsequent to drawing detection.

When the closing operation is the first one after the drawing detection (step S5: YES), the control circuit 21 drives the motor 11 to perform the first slow start (step S5). When the closing operation is not the first one (performed twice or more) after the drawing detection (step S6: NO), the control circuit 21 drives the motor 11 to perform the second slow start (step S6).

After the first slow start ends (after step S5 ends) or after the second slow start ends (after step S6 ends), the control circuit 21 drives the motor 11 to generate constant speed movement in the normal speed zone HZ (step S7).

While a closing operation is being continuously performed (step S8: YES), the control circuit 21 drives the motor 11 so that step S7, that is, the constant speed movement continues in the normal speed zone HS. For example, when the window glass reaches the fully closed position, the control circuit 21 stops driving the motor 11 and stops moving the window glass WG.

When the closing operation ends (step S8: NO), the control circuit 21 stops driving the motor 11 and stops moving the window glass WG (step S2).

The second embodiment has the advantages described below.

(4) The low speed zone LS for the first closing movement subsequent to a drawing detection is longer than the low speed zone LS for other movements. This reduces situations in which a sudden load is applied to a foreign matter when a closing operation is performed to release a drawn-in foreign matter subsequent to a drawing detection.

(5) The constant speed zone LS1 is set in the low speed zone LS for the first closing movement performed subsequent to a drawing direction. Thus, situations are reduced in which a sudden load is applied to a foreign matter in the constant speed zone LS1. This avoids a situation in which the load is relatively high in the speed increasing zone LS2 and the normal speed zone HS, particularly, when an entrapped foreign matter is released in the constant speed zone LS1.

(6) The constant speed zone LZS1 is where the speed is the lowest in the low speed zone LS. This reduces situations in which a sudden load is applied to a foreign matter.

The second embodiment may be modified as described below.

In the second embodiment, the low speed zone LS for only the first closing movement subsequent to a drawing detection is longer than the low speed zone LS for other movements. Instead, for example, the low speed zone LS for the second and subsequent closing movements subsequent to a drawing detection may be controlled to be lengthened depending on the time or movement amount of the closing operation.

The second embodiment is configured to perform the first slow start in the constant speed zone LS1 for a first closing operation subsequent to a drawing detection. Instead, for example, the speed increasing zone LS2 may be lengthened, that is, the speed increasing amount (acceleration) for a predetermined length of time may be decreased. Further, the speed is increased in conformance with a linear function in the speed increasing zone LS2 but may be increased in conformance with a quadratic function.

In the second embodiment, the control circuit 21 performs foreign matter detection (entrapment and drawing detection) using the speed change amount of the motor 11. Instead, for example, foreign matter detection may be performed using a characteristic value other than the speed change amount of the motor 11 (characteristic value of motor 11 that changes in accordance with movement of window glass WG).

In the second embodiment, the range of the low speed zone LS (predetermined value ΔP) is the same for a closing movement and an opening movement. Instead, the range of low speed zone LS may differ between a closing movement and an opening movement.

In the second embodiment, the present invention is applied to the power window device 10 that uses the X-arm type window regulator. The present invention may also be applied to a power window device that uses a wire-type window regulator or a power window device that uses a single-arm type window regulator.

In the second embodiment, the present invention is applied to the power window device 10 that opens and closes the window glass WG of the vehicle door D. Instead, the present invention may be applied to, for example, a sunroof device that opens a roof glass of a vehicle roof.

The second embodiment and the modified examples of the second embodiment may be combined.

A third embodiment in which a vehicle window opening device is embodied in a power window device will now be described. The power window device 10 of the third embodiment has the same configuration as the power window device 10 of the first embodiment shown in FIG. 1. The description will focus on differences from the first embodiment.

In the third embodiment, the control circuit 21 functions as an opening controller, an entrapment detector, a drawing detector, a restriction unit, and a restriction cancellation unit. The control circuit 21 invalidates the entrapment prevention function and disables automatic closing of the window glass WG based on a drawing determination. In detail, when a drawing determination is made, the control circuit 21 invalidates the entrapment determination in subsequent closing movements. That is, even if the speed change amount of the motor 11 during a closing operation becomes greater than or equal to the entrapment determination threshold value, the control circuit 21 does not reverse the movement of the window glass WG to the opening direction. Thus, the window glass WG is not reversed by a change in load that is caused by a drawn-in foreign matter.

Further, when making a drawing determination, the control circuit 21 invalidates the automatic close command signal from the operation switch 24 (in detail, automatic close command signal is changed to manual close command signal). Here, even when an automatic closing operation is performed on the operation switch 24, automatic closing of the window glass WG is not performed. Here, manual closing is enabled even when a drawing determination is made.

Then, the control circuit 21 validates the entrapment prevention function, which has been invalidated as described above, and enables automatic closing of the window glass WG after a drawing determination based on the frequency n of the closing movement of the window glass WG, the movement time t of the closing movement, and the movement amount p of the closing movement.

In detail, the control circuit 21 validates the entrapment prevention function and enables automatic closing when the frequency n of the closing movement of the window glass WG after a drawing determination becomes greater than or equal to a threshold value ns. The threshold value ns is, preferably, two or greater, and more preferably, three to five. In other words, it is preferred that the threshold value ns be set to validate the entrapment prevention function and enable automatic closing when the frequency n of the closing movement after a drawing determination is three to five.

Further, the control circuit 21 validates the entrapment prevention function and enables automatic closing when the closing movement time t of the window glass WG after the drawing detection (movement duration of single closing movement) becomes greater than or equal to a threshold value ts that is set in advance. The threshold value ts is preferably set to a time (e.g., one second) corresponding to approximately 50 mm, which is the actual movement amount when the window glass WG closes. In other words, it is preferred that the entrapment prevention function is validated and the automatic closing is enabled when the closing movement time t after the entrapment determination becomes one second or longer.

The control circuit 21 also validates the entrapment prevention function and enables automatic closing when the movement amount p (in the present embodiment, counted number of pulse edges of the rotation detection signal) in the closing direction from the position where the window glass WG was stopped in response to the drawing determination becomes greater than or equal to the threshold value ps. Preferably, the threshold value ps is the counted number of pulse edges of the rotation detection signal corresponding to the actual movement amount of approximately 50 mm when the window glass WG closes.

Further, the control circuit 21 validates the entrapment prevention function and enables automatic closing when receiving a manual open command signal or an automatic open command signal from the operation switch 24 after a drawing determination. The control circuit 21 also determines whether or not the window glass WG is located at the fully closed position (or fully closed region that includes fully closed position) after a drawing determination. The control circuit 21 validates the entrapment prevention function and enables automatic closing when the window glass WG is located at the fully closed position (or fully closed region).

The control and operation when detecting foreign matter drawing of the third embodiment will now be described.

Figure 6:
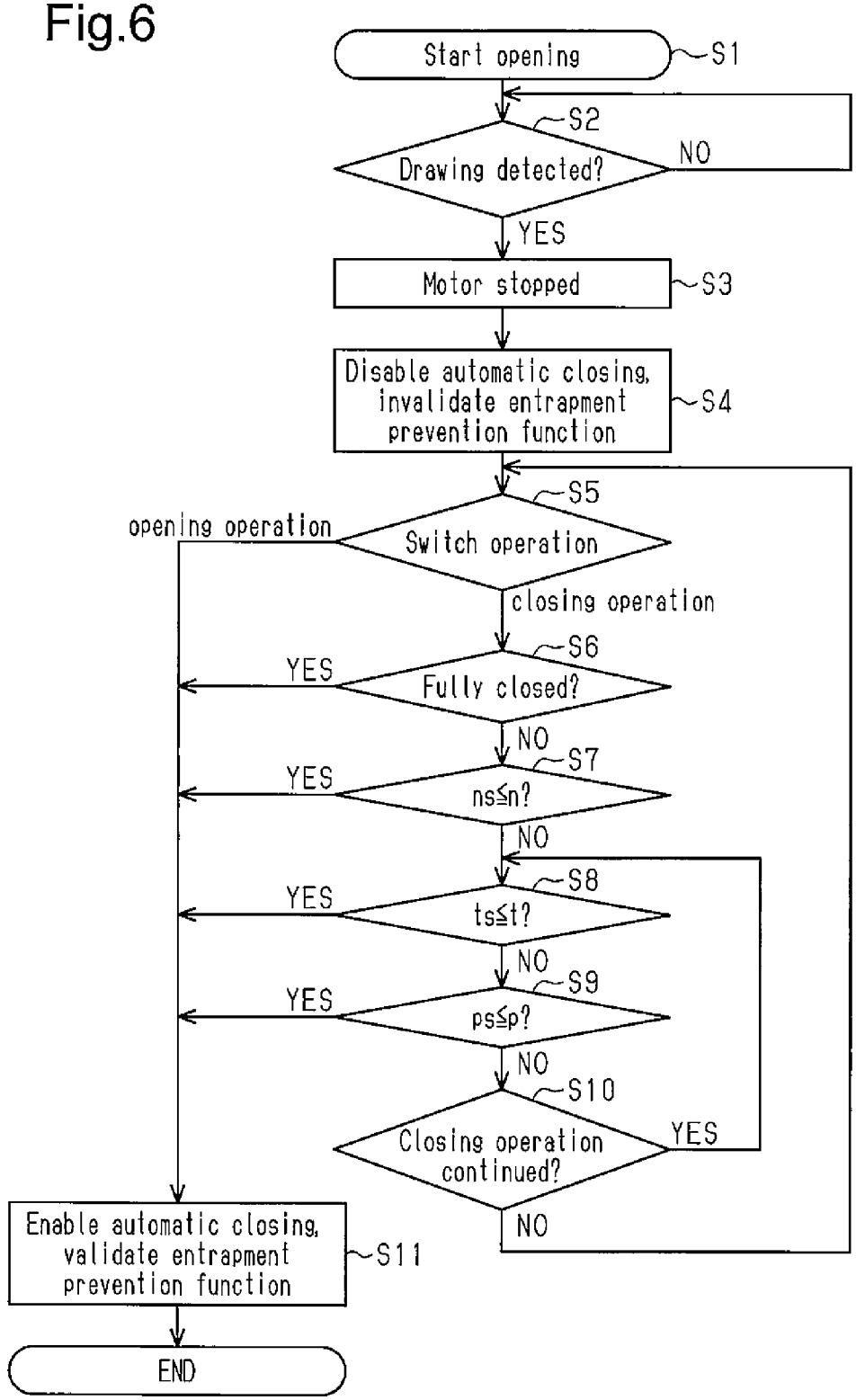
FIG. 6 is a flowchart illustrating the control executed by a power window device according to a third embodiment of the present invention.

As shown in FIG. 6, when the control circuit 21 receives a manual open command signal or an automatic open command signal from the operation switch 24, the control circuit 21 supplies the motor 11 with power through the drive circuit 22 and opens the window glass WG (step S1).

In step S2, the control circuit 21 performs foreign matter drawing determination on the opening window glass WG. Here, the control circuit 21 compares the speed change amount of the motor 11 with the drawing determination threshold value. When the speed change amount is less than the drawing determination threshold value, the control circuit 21 determines that the window glass WG has not drawn in a foreign matter and repeats step S2. When the speed change amount is greater than or equal to the threshold value, the control circuit 21 determines that the window glass WG has drawn in a foreign matter and stops driving the motor 11 to stop opening the window glass WG (step S3). Further, in step S3, the control circuit 21 initializes (resets) the closing movement frequency n of the window glass WG, the closing movement time t, and the closing movement amount p that are stored in the memory (not shown).

In step S4, the control circuit 21 invalidates the entrapment prevention function as described above. For example, after a drawing detection, when closing the window glass WG to release the drawn-in foreign matter, the characteristic value of the motor 11 may become greater than or equal to the entrapment threshold value because of a change in load caused by the drawn-in foreign matter. Nevertheless, the entrapment prevention function is invalidated so that the window glass WG is not reversed (opened). This allows the drawn-in foreign matter to be easily removed.

In step S4, the control circuit 21 disables automatic closing of the window glass WG as described above. Thus, when the entrapment prevention function is invalidated, the window glass WG cannot be automatically closed.

Then, in step S5, when the operation switch 24 is operated, the control circuit 21 determines whether or not the switch operation is an opening operation or a closing operation. When determining that the switch operation is an opening operation, the control circuit 21 validates the entrapment prevention function and enables automatic closing (step S11). When determining that the switch operation is a closing operation, the control circuit 21 closes the window glass WG and proceeds to step S6. Here, even when the operation of the operation switch 24 is an automatic closing operation (two-step operation), the control circuit 21 manually closes the window glass WG. The control circuit 21 adds one to a closing movement frequency counter (closing movement frequency n) when a closing operation is performed on the operation switch 24. Further, the control circuit 21 starts measuring the closing movement time t with a timer (not shown).

In step S6, the control circuit 21 determines whether or not the window glass WG is located at the fully closed position (or fully closed region). When the window glass WG is located at the fully closed position (or fully closed region), the control circuit 21 validates the entrapment prevention function and enables automatic closing (step S11). When the window glass WG is not located at the fully closed position (or fully closed region), the control circuit 21 proceeds to step S7.

In step S7, the control circuit 21 compares the closing movement frequency n (closing movement frequency counter) with the threshold value ns, which is set in advance. When the closing movement frequency n is greater than or equal to the threshold value ns, the control circuit 21 validates the entrapment prevention function and enables the automatic closing operation (step S11). When the closing movement frequency n is less than the threshold value ns, the control circuit 21 proceeds to step S8.

In step S8, the control circuit 21 compares the movement time t from when a closing movement is started with the threshold value ts, which is set in advance. When the movement time t is longer than or equal to the threshold value ts, the control circuit 21 validates the entrapment prevention function and enables the automatic closing operation (step S11). When the movement time t is shorter than the threshold value ts, the control circuit 21 proceeds to step S9.

In step S9, the control circuit 21 compares the movement amount p in the closing direction from the stop position of the window glass WG with the threshold value ps, which is set in advance. When the movement amount p is greater than or equal to the threshold value ps, the control circuit 21 validates the entrapment prevention function and enables the automatic closing operation (step S11). When the movement amount p is less than the threshold value ps, the control circuit 21 proceeds to step S10.

In step S10, the control circuit 21 determines whether or not a closing operation has been continuously performed on the operation switch (whether or not a close command signal is being input). When a closing operation is being continuously performed, the control circuit 21 returns to step S8. When the operation switch 24 is deactivated and a close command signal is not received, the control circuit 21 returns to step S5. When the closing operation of the operation switch 24 is stopped, the measurement of the movement time t by the timer is temporarily stopped.

The third embodiment has the advantages described below.

(7) The control circuit 21 invalidates the entrapment prevention function based on a drawing determination. In other words, after a drawing detection, the control circuit 21 restricts the entrapment prevention control so that reversing (opening) is not performed even if the speed change amount of the motor 11 becomes greater than or equal to the entrapment determination threshold value when the window glass WG is closing. For example, when closing the window glass WG to release a drawn-in foreign matter, the speed change amount of the motor 11 may become greater than or equal to the entrapment determination threshold value if the drawn-in foreign matter changes the load. Even in such a case, the window glass WG is not reversed (opened) because of the invalidated entrapment prevention function. This allows the drawn-in foreign matter to be easily released.

The control circuit 21 validates the entrapment prevention function after a drawing detection based on the closing movement frequency n of the window glass WG, the closing movement time t, and the closing movement amount p. In other words, the control circuit 21 cancels the restriction of the entrapment prevention control (movement reversal when the speed change amount of motor 11 becomes greater than or equal to entrapment determination threshold value) and returns the control mode to the normal mode. This allows the entrapment prevention function to be validated in a preferred manner. In particular, at least one of the closing movement time t and the closing movement amount p is used as the condition (returning condition) for validating the entrapment prevention function. This is further desirable since control is executed to validate the entrapment prevention function when the window glass WG has been moved by a distance that is sufficient for validating the entrapment prevention function (e.g., approximately 50 mm). Further, the returning condition based on the closing movement frequency n may be set to be stricter (increase threshold value ns). This limits validation of the entrapment prevention function when a foreign matter is drawn in and the surprised vehicle occupant repetitively performs a closing operation on the operation switch 24 a number of times but the movement amount of the window glass WG in the closing direction is not sufficient for releasing the foreign matter.

(8) When the entrapment prevention function is invalidated, the control circuit disables automatic closing of the window glass WG. This prevents automatic closing of the window glass WG from entrapping a foreign matter when the entrapment prevention function is invalidated.

(9) When the window glass WG is located at the fully closed position (or fully closed region), the control circuit 21 validates (recovers) the entrapment prevention function. This allows unnecessary calculations to be decreased.

The third embodiment may be modified as described below.

In the third embodiment, the control circuit 21 performs foreign matter detection (entrapment and drawing detection) using the speed change amount of the motor 11. Instead, for example, foreign matter detection may be performed using a characteristic value other than the speed change amount of the motor 11 (characteristic value of motor 11 that changes in accordance with movement of window glass WG).

In the third embodiment, the control circuit 21 reverses and moves the window glass WG for a predetermined amount in the opening direction when entrapment is determined. Instead, for example, the motor 11 may be stopped when entrapment is determined. Further, in the third embodiment, the control circuit 21 stops driving the motor 11 when drawing is detected to stop opening the window glass WG. In addition, when drawing is detected, the control circuit 21 may reverse and move the window glass WG for a predetermined amount in the closing direction.

In the third embodiment, after invalidating the entrapment prevention function and disabling automatic closing in accordance with a drawing determination, the control circuit 21 validates the entrapment prevention function based on the closing movement frequency n of the window glass WG, the closing movement time t, and the closing movement amount p. Instead, the control circuit 21 may validate the entrapment prevention function based on at least one of the closing movement frequency n of the window glass WG, the closing movement time t, and the closing movement amount p. For example, without considering the closing movement frequency n, the entrapment prevention function may be validated based on the closing movement time t and the closing movement amount p.

In the third embodiment, the closing movement time t is the cumulative time of the closing movement during an opening movement disabling mode. However, the closing movement time t may be the duration time of a single closing movement during the closing movement time t.

In step S8 of the third embodiment, the control circuit 21 may validate the entrapment prevention function and enable automatic closing if the movement time t is greater than or equal to the threshold value is when the closing operation of the operation switch 24 ends (operation switch 24 is deactivated). In the same manner, in step S9 of the third embodiment, the control circuit 21 may validate the entrapment prevention function and enable automatic closing if the closing movement amount p is greater than or equal to the threshold value ps when the closing operation of the operation switch 24 ends (operation switch 24 is deactivated).

In the third embodiment, the control circuit 21 invalidates the entrapment determination when closing the window to invalidate the entrapment prevention function. Instead, for example, the control circuit 21 may stop performing the entrapment determination (i.e., stop comparing speed change amount of motor 11 with entrapment determination threshold value) to invalidate the entrapment prevention function.

In the third embodiment, the present invention is applied to the power window device 10 that uses the X-arm type window regulator. The present invention may also be applied to, for example, a power window device that uses a wire-type window regulator.

In the third embodiment, the present invention is applied to the power window device 10 that opens and closes the window glass WG of the vehicle door D. Instead, the present invention may be applied to, for example, a sunroof device that opens a roof glass of a vehicle roof.

A technical concept that can be acknowledged from the third embodiment and the modified examples of the third embodiment will now be described.

(B) A vehicle window opening device comprising:
an opening controller configured to control opening and closing of a vehicle window based on a drive force of a motor;
an entrapment determination unit;
a drawing determination unit;
a restriction unit; and
a restriction cancellation unit;
wherein the entrapment determination unit is configured to determine that the vehicle window has entrapped a foreign matter when a characteristic value of the motor, which changes in accordance with a change in a load applied to the closing vehicle window, is greater than or equal to a first threshold value;
the drawing determination unit is configured to determine that the vehicle window has drawn in a foreign matter when a characteristic value of the motor, which changes in accordance with a change in a load applied to the opening vehicle window, is greater than or equal to a second threshold value;
the opening controller is configured to execute entrapment prevention control that reverses or stops a closing movement of the vehicle window in response to an entrapment determination of the entrapment determination unit, and the opening controller is configured to execute drawing prevention control that reverses or stops an opening movement of the vehicle window in response to a drawing determination of the drawing determination unit;
the restriction unit restricts the entrapment prevention control after the drawing determination so that the opening controller does not execute the entrapment prevention control even when the characteristic value of the motor is greater than or equal to the first threshold value when the vehicle window is closing; and
the restriction cancellation unit is configured to cancel the restriction of the entrapment prevention control imposed by the restriction unit when a closing movement time of the vehicle window after the drawing determination reaches a predetermined value.

(C) A vehicle window opening device comprising:
an opening controller configured to control opening and closing of a vehicle window based on a drive force of a motor;
an entrapment determination unit;
a drawing determination unit;
a restriction unit; and
a restriction cancellation unit;
wherein the entrapment determination unit is configured to determine that the vehicle window has entrapped a foreign matter when a characteristic value of the motor, which changes in accordance with a change in a load applied to the closing vehicle window, is greater than or equal to a first threshold value;
the drawing determination unit is configured to determine that the vehicle window has drawn in a foreign matter when a characteristic value of the motor, which changes in response to a change in a load applied to the opening vehicle window, is greater than or equal to a second threshold value;
the opening controller is configured to execute entrapment prevention control that reverses or stops a closing movement of the vehicle window in response to an entrapment determination of the entrapment determination unit, and the opening controller is configured to execute drawing prevention control that reverses or stops an opening movement of the vehicle window in accordance with a drawing determination of the drawing determination unit;
the restriction unit restricts the entrapment prevention control after the drawing determination so that the opening controller does not execute the entrapment prevention control even when the characteristic value of the motor is greater than or equal to the first threshold value when the vehicle window is closing; and
the restriction cancellation unit is configured to cancel the restriction of the entrapment prevention control imposed by the restriction unit when a closing movement amount of the vehicle window after the drawing determination reaches a predetermined value.

The configurations of clauses (B) and (C) invalidate the entrapment prevention function. For example, when closing the vehicle window to release a drawn-in foreign matter after a drawing determination, the drawn-in foreign matter may change the load and cause the characteristic value of the motor to become greater than or equal to the first threshold value. Even in such a case, the entrapment prevention function is invalidated so that movement of the vehicle window is not reversed (opened) or stopped. This allows the drawn-in foreign matter to be easily released. Further, at least one of the closing movement time and the closing movement amount is used as a condition (returning condition) for validating the entrapment prevention function. Thus, when the vehicle window has been closed for a movement amount that is sufficient for releasing the drawn-in foreign matter, validation (recovery) of the entrapment prevention control is allowed.

A fourth embodiment in which a vehicle window opening device is embodied in a power window device will now be described. The power window device 10 of the fourth embodiment has the same configuration as the power window device 10 of the first embodiment shown in FIG. 1. The description will focus on differences from the first embodiment.

Figure 7:
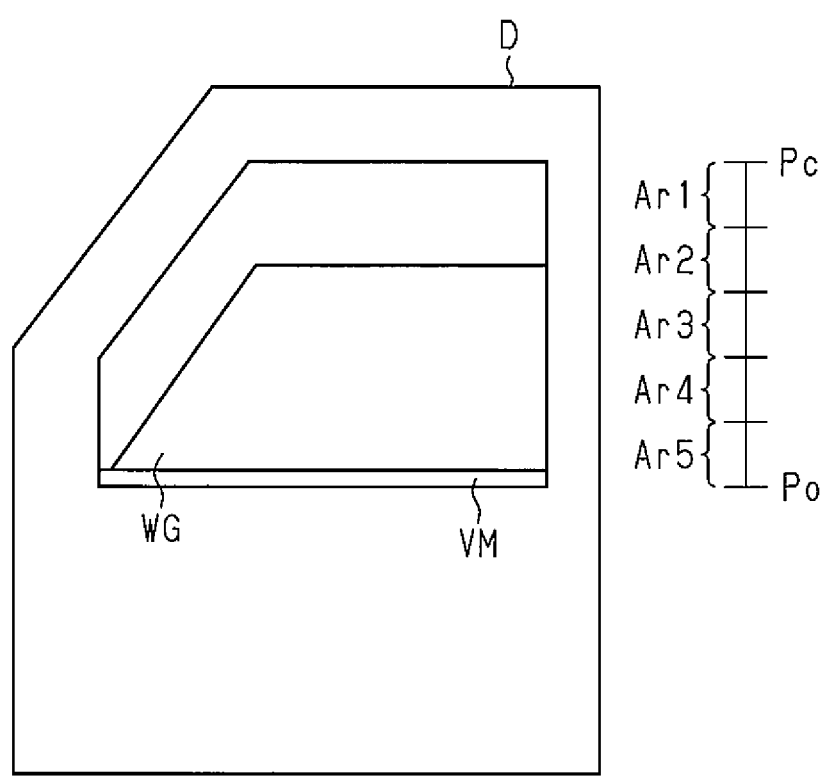
FIG. 7 is a schematic diagram illustrating the opening and closing of a window glass in a power window device according to a fourth embodiment of the present invention.

In the fourth embodiment, the control circuit 21 functions as a controller, an entrapment determination unit, a drawing determination unit, and a restriction unit. Referring to FIG. 7, the control circuit 21 recognizes the fully closed position Pc and the fully open position Po of the window glass WG. As described above, the fully closed position Pc is set where the counted number of the pulse edges is zero. The fully open position Pi is set, for example, where the counted number of pulse edges from the fully closed position Pc is a predetermined value. The fully open position Po may differ depending on the vehicle (specification).

When the control circuit 21 determines that a foreign matter has been drawn in by the window glass WG, the control circuit 21 changes the drawing determination threshold value $\omega t$.

Further, the control circuit 21 sets a plurality of regions at substantially equal intervals in a range from the fully closed position Pc to the fully open position Po. In the present embodiment, as shown in FIG. 7, five regions (set regions), namely, region Ar1, region Ar2, region Ar3, region Ar4, and region Ar5 are set in order from the fully closed position Pc.

When the control circuit 21 makes a drawing determination, the control circuit 21 determines the one of the regions Ar1 to Ar5 where the window glass WG is located. Then, the control circuit 21 stores the determined one of the regions Ar1 to Ar5 (drawing determination region ArM) in the memory (not shown).

The control circuit 21 sets the determination threshold value $\omega t$ to a determination threshold value $\omega t1$ (first value) until a drawing determination is made. The determination threshold value $\omega t$ remains set to the determination threshold value $\omega t1$ for a while after a drawing determination. The window glass WG may be opened after the drawing determination so as to pass through the determination region ArM a number of times. In the drawing determination region ArM stored in the memory, the control circuit 21 may consecutively determine a number of times that the detected value is greater than or equal to a reference threshold value C that is the same as the threshold value $\omega t1$. In this case, the control circuit 21 sets (changes) the drawing determination threshold value $\omega t$ to a second drawing threshold value $\omega t2$ (second value) that is larger than the first drawing determination threshold value $\omega t1$. That is, in the present embodiment, one of the first drawing determination threshold value $\omega t1$ and the second drawing determination threshold value $\omega t2$ is selected as the drawing determination threshold value $\omega t$. The second drawing threshold value $\omega t2$ is a threshold value that corresponds to a situation in which a door belt molding VM in a lower portion of the window frame of the vehicle is repetitively drawn. More specifically, the second drawing determination threshold value $\omega t2$ is larger than the speed change amount $\omega$ of the motor 11 when the drawing of only the door belt molding VM changes the load acting on the window glass WG. Further, the second drawing determination threshold value $\omega t2$ is smaller than the speed change amount of the motor 11 when a foreign matter changes the load acting on the window glass WG. Thus, even when the door belt molding VM is drawn as a result of repetitive drawing of the door belt molding VM at the same location, drawing is not determined since the second drawing determination threshold value $\omega t2$ is used as the drawing determination threshold value.

One example of the operation of the power window device 10 will now be described.

The control circuit 21 of the power window device 10 of the fourth embodiment supplies the motor 11 with power to open or close the window glass WG when a user performs an operation (opening operation or closing operation) on the operation switch 24. The control circuit 21 detects when a foreign matter is entrapped by the closing window glass WG. Further, the control circuit 21 detects when a foreign matter is drawn into the vehicle door D by the opening window glass WG.

The present embodiment executes a control for repetitive drawing of the door belt molding VM at the lower end of the window frame. An example of the control will now be described referring mainly to FIG. 8.

Figure 8:
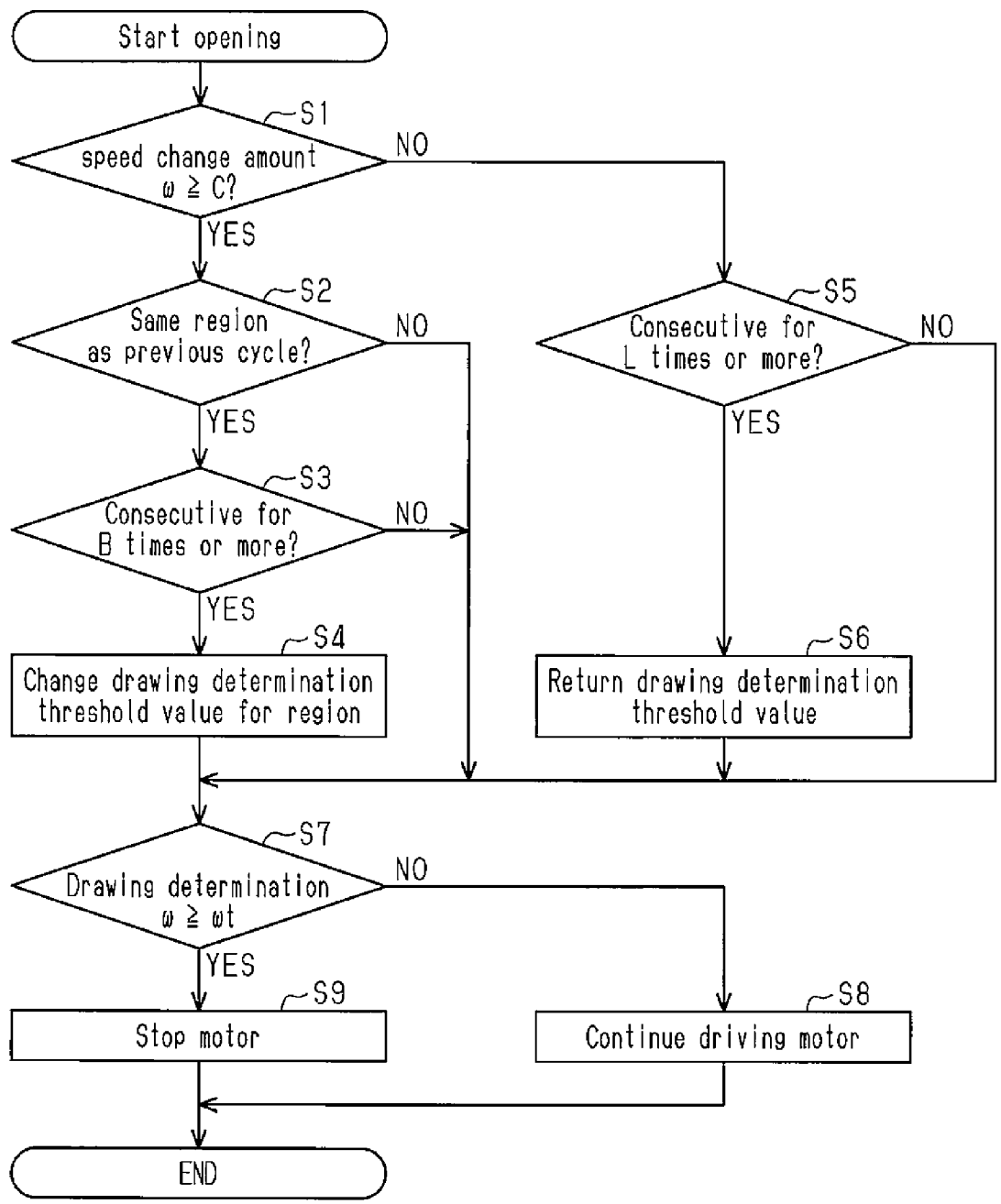
FIG. 8 is a flowchart illustrating the control executed by the power window device in the fourth embodiment.

Referring to FIG. 8, the control circuit 21 compares the speed change amount $\omega$ of the motor 11 when opening the window with the reference value C (step S1). In the present embodiment, the reference threshold value C is set to a value that is the same as the first drawing determination threshold value $\omega t1$, namely, the first value.

When the speed change amount $\omega$ is greater than or equal to the reference threshold value C (step S1: YES), the control circuit 21 determines whether or not the window glass WG is located in the same one of the regions Ar1 to Ar5 as when an affirmative determination was made in step S1 of the previous cycle (step S2).

When the window glass WG is located in the same region as when an affirmative determination was made in step S1 of the previous cycle (step S2: YES), the control circuit 21 determines whether or not an affirmative determination was made in step S1 consecutively for a predetermined number B of times or more (step S3). It is preferred that the predetermined number B be set in the range of three to five.

When the control circuit 21 determines that an affirmative determination was made in step S1 consecutively for a predetermined number B of times or more (step S3: YES), the control circuit 21 sets the drawing determination threshold value $\omega t$ for the region where the affirmative determination was made in step S1 to the second drawing determination threshold value $\omega t2$ that is greater than the first drawing determination threshold value $\omega t1$ (step S4).

When the speed change amount $\omega$ is less than the reference threshold value C (step S1: NO), the control circuit 21 determines whether or not a negative determination of step S1 has been consecutively made for a predetermined number of times L or more (step S5). It is preferred that the predetermined number L be set in the range of three to five.

When a negative determination of step S1 has been consecutively made for a predetermined number of times L or more (step S5: YES), the control circuit 21 sets the drawing determination threshold value $\omega t$ to the first drawing determination threshold value $\omega t1$ (step S6).

The control circuit 21 performs drawing determination (step S7) after step S4, when step S2 is NO, after step S6, or when a negative determination is made in step S5. More specifically, the control circuit 21 determines whether or not the speed change amount $\omega$ of the motor 11 is greater than or equal to the determination threshold value $\omega t$. Here, the drawing determination threshold value $\omega t$ is the first drawing determination threshold value $\omega t1$ or the second drawing determination threshold value $\omega t2$. However, the drawing determination threshold value $\omega t$ is normally set to the first drawing determination threshold value $\omega t1$.

When the speed change amount co of the motor 11 is less than the determination threshold value $\omega t$ (step S7: NO), the control circuit 21 continues to drive the motor 11 (step S8).

When the speed change amount co of the motor 11 is greater than or equal to the determination threshold value (step S7: YES), the control circuit 21 stops driving the motor 11 (step S9).

An example following the above steps in order will now be described. In the description hereafter, the predetermined number B and the predetermined number L are set to three. Further, in the description hereafter, unless otherwise mentioned, whenever opened, the window glass WG is first fully closed before opening.

First Opening Movement

In the first opening movement, for example, when the speed change amount $\omega$ is greater than or equal to the reference threshold value C (step S1: YES), the control circuit 21 proceeds to step S2. The region determination and drawing determination are not made during the first opening movement. Thus, the control circuit 21 determines in step S2 that the location where an affirmative determination was made in step S1 differs from the region of the previous cycle (step S2: NO). Accordingly, the control circuit 21 proceeds to step S7 to perform the drawing determination.

In the first opening movement, when the speed change amount $\omega$ is less than the reference value C (step S1: NO), the determination that the speed change amount $\omega$ is less than the reference threshold value C has not been consecutively made for the predetermined number L of times or more (step S5: NO). Thus, the control circuit 21 proceeds to step S7 to perform the drawing determination.

In this manner, in the first opening movement, the control circuit 21 compares the determination threshold value $\omega t$, which is set to the first drawing determination threshold value $\omega t1$, with the speed change amount $\omega$ regardless of whether the speed change amount $\omega$ is greater than or equal to the reference threshold value C or less than the reference threshold value C.

Yth Opening Movement

During the Yth opening movement, when the speed change amount $\omega$ becomes greater than or equal to the drawing determination threshold value $\omega t$ for the first time and a drawing determination is made (step S7: YES), the control circuit 21 executes entrapment prevention control that stops driving the motor 11 to stop the window glass WG (step S9). In this case, the control circuit 21 determines which one of the regions Ar1 to Ar5 the window glass WG was located in when the drawing determination was made and sets the drawing determination region ArM to that region. Here, the drawing determination threshold value $\omega t$ remains set to the first drawing determination threshold determination threshold value $\omega t1$.

(Y+1)th Opening Movement

During the (Y+1)th opening movement, when the speed change amount $\omega$ becomes greater than or equal to the reference threshold value C (step S1: YES), the control circuit 21 determines whether or not the window glass WG is presently located in the drawing determination region ArM (step S2). When the window glass WG is located in the drawing determination region ArM (step S2: YES), the control circuit 21 determines whether or not the determination that the window glass WG is located in the drawing determination region ArM has been consecutively made for the predetermined number B of times (three times) or more (step S3). In this case, the determination has been consecutively made two times. Thus, the control circuit 21 determines that this is less than the predetermined number B (step S3: NO) and executes the drawing determination without changing the drawing determination threshold value $\omega t$ (step S7). That is, the drawing threshold value $\omega t$ remains set to the first drawing determination threshold value $\omega t1$.

As described above, the first drawing determination threshold value $\omega t1$ is equal to the reference threshold value C. Thus, the control circuit 21 determines that the speed change amount $\omega$ of the motor 11 is greater than or equal to the drawing determination threshold value $\omega t$ (step S7: YES) and stops driving the motor 11 (step S9).

(Y+2)th Opening Movement

During the (Y+2)th opening movement, when the speed change amount $\omega$ becomes greater than or equal to the reference threshold value C (step S1: YES), the control circuit 21 determines whether or not the window glass WG is presently located in the drawing determination region ArM (step S2). When the window glass WG is located in the drawing determination region ArM (step S2: YES), the control circuit 21 determines whether or not the determination that the window glass WG is located in the drawing determination region ArM has been consecutively made for the predetermined number B of times (three times) or more (step S3). In this case, the determination has been consecutively made three times (step S3: YES), and the control circuit 21 determines that the drawing is caused by repetitive drawing of the door belt molding VM and sets the drawing determination threshold value $\omega t$ for the drawing determination region ArM to the second drawing determination threshold value $\omega t2$ (step S4).

Then, the control circuit 21 performs the comparison (drawing determination) of the drawing determination threshold value $\omega t$, which is set to the second drawing determination threshold value $\omega t2$, and the speed changing amount $\omega$ of the motor 11 (step S7). The speed change amount $\omega$ is less than the drawing determination threshold value $\omega t$ (second drawing determination threshold value $\omega t2$) when the door belt molding VM is changing the speed of the motor 11 (step S7: NO). This limits erroneous detections caused by repetitive drawing of the door belt molding VM until the repetitive drawing of the door belt molding VM is resolved.

Zth Opening Movement

When the speed change amount $\omega$ is less than the reference threshold value C in the Zth ((Y+3)th or more) opening movement (step S1: NO), that is, when the speed change amount $\omega$ is not greater than or equal to the reference threshold value C in the drawing determination region ArM, the control circuit 21 proceeds to step S5. In step S5, the control circuit 21 determines whether or not the negative determination has been made in step S1 for a predetermined number L of (three) times (step S5). For example, when the negative determination has been made for the first time in step S1, the control circuit 21 determines that the negative determination has been made in step S1 for a number of times that is less than the predetermined number L (step S5: NO). Further, the control circuit 21 keeps the drawing determination threshold value $\omega t$ set to the second drawing determination threshold value $\omega t2$. The control circuit 21 then continues subsequent processing from step S7.

(Z+1)th Opening Movement

When the speed change amount $\omega$ is less than the reference threshold value C in the (Z+1)th opening movement (step S1: NO), that is, when the speed change amount $\omega$ is not greater than or equal to the reference threshold value C in the drawing determination region ArM, the control circuit 21 proceeds to step S5. In step S5, the control circuit 21 determines whether or not the negative determination has been made in step S1 for a predetermined number L of (three) times (step S5). For example, when the negative determination has been made in step S1 for the second time, the control circuit 21 determines that the negative determination has been made in step S1 for a number of times that is less than the predetermined number L (step S5: NO). Further, the control circuit 21 keeps the drawing determination threshold value $\omega t$ set to the second drawing determination threshold value $\omega t2$. The control circuit 21 then continues subsequent processing from step S7.

(Z+2)th Opening Movement

When the speed change amount $\omega$ is less than the reference threshold value C in the (Z+2)th opening movement (step S1: NO), that is, when the speed change amount $\omega$ is not greater than or equal to the reference threshold value C in the drawing determination region ArM, the control circuit 21 proceeds to step S5. In step S5, the control circuit 21 determines whether or not the negative determination has been made in step S1 for a predetermined number L of (three) times (step S5). For example, when the negative determination has been made in step S1 for the third time, the control circuit 21 determines that the negative determination has been made in step S1 for a number of times that is greater than or equal to the predetermined number L (step S5: YES). Thus, the control circuit 21 sets the drawing determination threshold value $\omega t$ to the first drawing determination threshold value $\omega t1$ (step S6).

In this manner, once the control circuit 21 sets the drawing determination threshold value $\omega t$ for the drawing determination region ArM to the second drawing determination threshold value $\omega t2$ and then consecutively determines for the predetermined number of times that the speed change amount $\omega$ of the drawing determination region is less than the reference threshold value C, the control circuit 21 determines that, for example, repetitive drawing of the door belt molding VM has been resolved and sets the drawing determination threshold value $\omega t$ to the determination threshold value $\omega t1$.

The fourth embodiment has the advantages described below.

(10) When the speed change amount $\omega$, which is a motor characteristic value, is consecutively greater than or equal to the reference threshold value C in the same region (drawing determination region ArM), the control circuit 21 changes the drawing determination threshold value $\omega t$ to the second drawing determination threshold value $\omega t2$, which is larger than the first drawing determination threshold value $\omega t1$. Repetitive drawing of the door belt molding VM may change the load applied to the window glass WG. The speed change amount of the motor 11 caused by load change in this case is lower than when drawing in a foreign matter other that a component of the vehicle. In the fourth embodiment, the second drawing determination threshold value $\omega t2$ is set to a value corresponding to repetitive drawing of the door belt molding VM and is lower than a value corresponding to drawing of a foreign matter other than a vehicle component. This reduces erroneous drawing detections caused by repetitive drawing of the door belt molding VM.

(11) Among the set regions Ar1 to Ar5, the region corresponding to where the window glass WG is located when determining drawing is set as the drawing determination region ArM. Thus, there is no need for region setting in each cycle. This allows the calculation load to be reduced in, for example, the control circuit 21.

(12) When the speed change amount $\omega$ in the drawing determination region ArM is consecutively less than or equal to the first value (reference threshold value C) for a predetermined number of times, the control circuit 21 determines that repetitive drawing of the door belt molding VM has been resolved and sets the drawing determination threshold value $\omega t$ to the first drawing determination threshold value $\omega t1$, which is the initial value. Subsequently, this allows drawing to be quickly determined.

The fourth embodiment may be modified as described below.

In the fourth embodiment, five regions Ar1 to Ar5 are set in advance. Instead, for example, only two or more regions (setting regions) need be set in advance. The number of the two or more regions (setting regions) may be set in accordance with the movement region of the window glass WG. For example, even in the same vehicle, the number of regions may differ between a window glass WG located next to a front seat (driver seat or passenger seat) and a window glass WG located next to a rear seat.

In the fourth embodiment, the drawing determination threshold value $\omega t$ is changed in accordance with the situation. Instead, for example, the control circuit 21 may be configured to restrict execution of the drawing prevention control when a drawing determination is made and then drawing is consecutively determined in the drawing determination region ArM. One such example will now be described with reference to FIG. 9.

Figure 9:
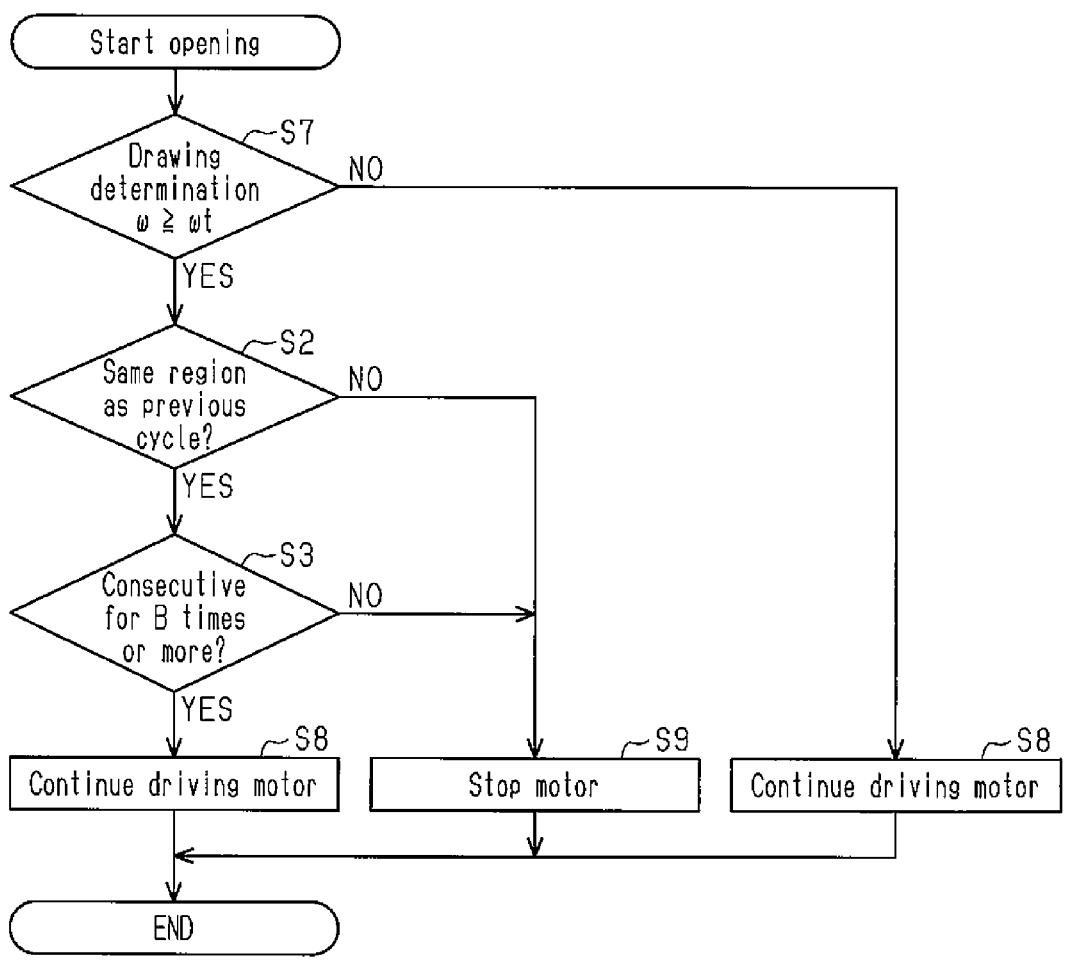
FIG. 9 is a flowchart illustrating the control executed by a power window device in a further example of the fourth embodiment.

As shown in FIG. 9, when the window is opening, the control circuit 21 determines whether or not the speed change amount $\omega$ of the motor 11 is greater than or equal to the drawing determination threshold value $\omega t$.

When the speed change amount $\omega$ of the motor 11 is less than the drawing determination threshold value $\omega t$ (step S7: NO), the control circuit 21 determines that drawing is not occurring and continues to drive the motor 11 (step S8).

When the speed change amount $\omega$ is greater than or equal to the drawing determination threshold value $\omega t$ (step S7: YES), the control circuit 21 determines whether or not the window glass WG is located in the same one of the regions Ar1 to Ar5 as when an affirmative determination was made in step S7 of the previous cycle (step S2).

When the window glass WG is not located in the same region as when an affirmative determination was made in step S7 of the previous cycle (step S2: NO), the control circuit 21 determines that drawing is occurring and stops the motor 11 (step S9).

If the window glass WG is located in the same region as when an affirmative determination was made in step S7 of the previous cycle (step S2: YES), the control circuit 21 determines whether or not the determination that the window glass WG being is in the determination region ArM when the speed change amount $\omega$ became greater than or equal to the drawing determination threshold value $\omega t$ has been consecutively made for the predetermined number B of times or more (step S3).

When an affirmative determination of step S2 has been made consecutively for less than the predetermined number B of times (step S3: NO), the control circuit 21 determines that drawing has occurred and stops the motor 11 (step S9).

When an affirmative determination of step S2 has been consecutively made for the predetermined number B of times or more (step S3: YES), the control circuit 21 determines that drawing of the door belt molding VM caused by repetitive drawing of the door belt molding VM has occurred and continues to drive the motor 11 (step S8).

In such a control example, when a drawing determination is consecutively made in the drawing determination region ArM, the control circuit 21 determines that drawing has been caused by repetitive drawing of the door belt molding VM and does not execute the drawing prevention control in that region ArM. This reduces erroneous drawing detections caused by repetitive drawing of the door belt molding VM.

In the fourth embodiment, the predetermined number L and the predetermined number B are set to the range of three to five. However, as long as the number is more than one, the number may be changed in accordance with the specification or application.

In the fourth embodiment, when the speed change amount $\omega$ of the motor 11 is less than the reference threshold value C (recovery threshold value) during a number of opening movements for a number of times that is greater than or equal to L, the control circuit 21 changes (returns) the threshold value $\omega t$ from the second drawing determination threshold value $\omega t2$ to the first drawing determination threshold value $\omega t1$. The condition for returning the drawing determination threshold value $\omega t$ to its original value is not limited in such a manner. For example, the example described below may be employed.

Figure 10:
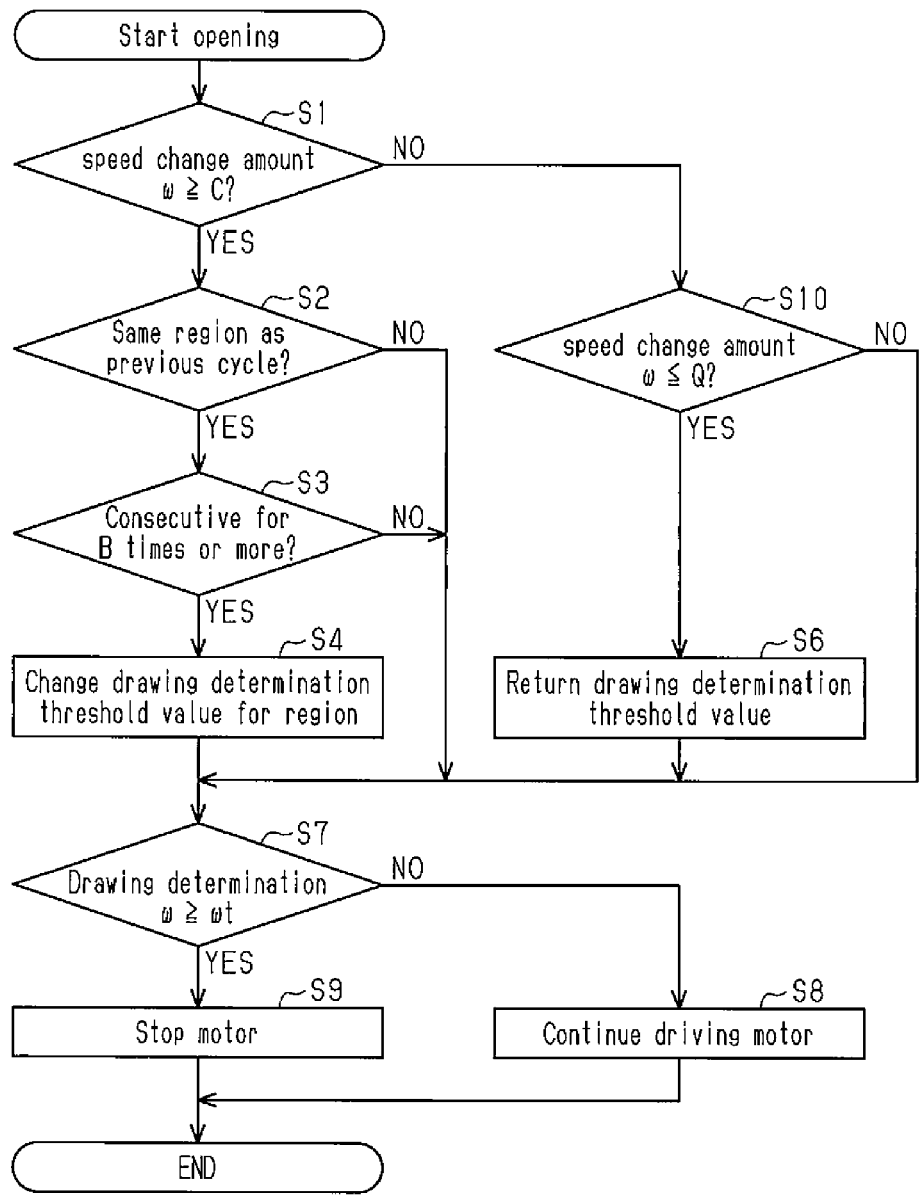
FIG. 10 is a flowchart illustrating the control executed by a power window device in a further example of the fourth embodiment.

As shown in FIG. 10, when the speed change amount $\omega$ of the motor 11 in the drawing determination region ArM during an opening movement becomes less than the reference threshold value C (recovery threshold value) in step S1, the control circuit 21 determines whether or not the speed change amount $\omega$ is less than or equal to a threshold value Q, which is a third value that is smaller than reference threshold value C (step S10). When the speed change amount $\omega$ is less than or equal to a threshold value Q (step S10: YES), the control circuit 21 sets the drawing determination threshold value $\omega t$ to the first drawing determination threshold value $\omega t1$ (step S6). In this manner, when the speed change amount $\omega$ in the drawing determination region ArM becomes less than the first value (reference threshold value C), the control circuit 21 determines that repetitive molding of the door belt molding VM has been resolved and sets the drawing determination threshold value $\omega t$ to the first drawing determination threshold value $\omega t1$, which is the first value that is the initial value. This allows for subsequent foreign matter drawing determination to be quickly performed.

Figure 11:
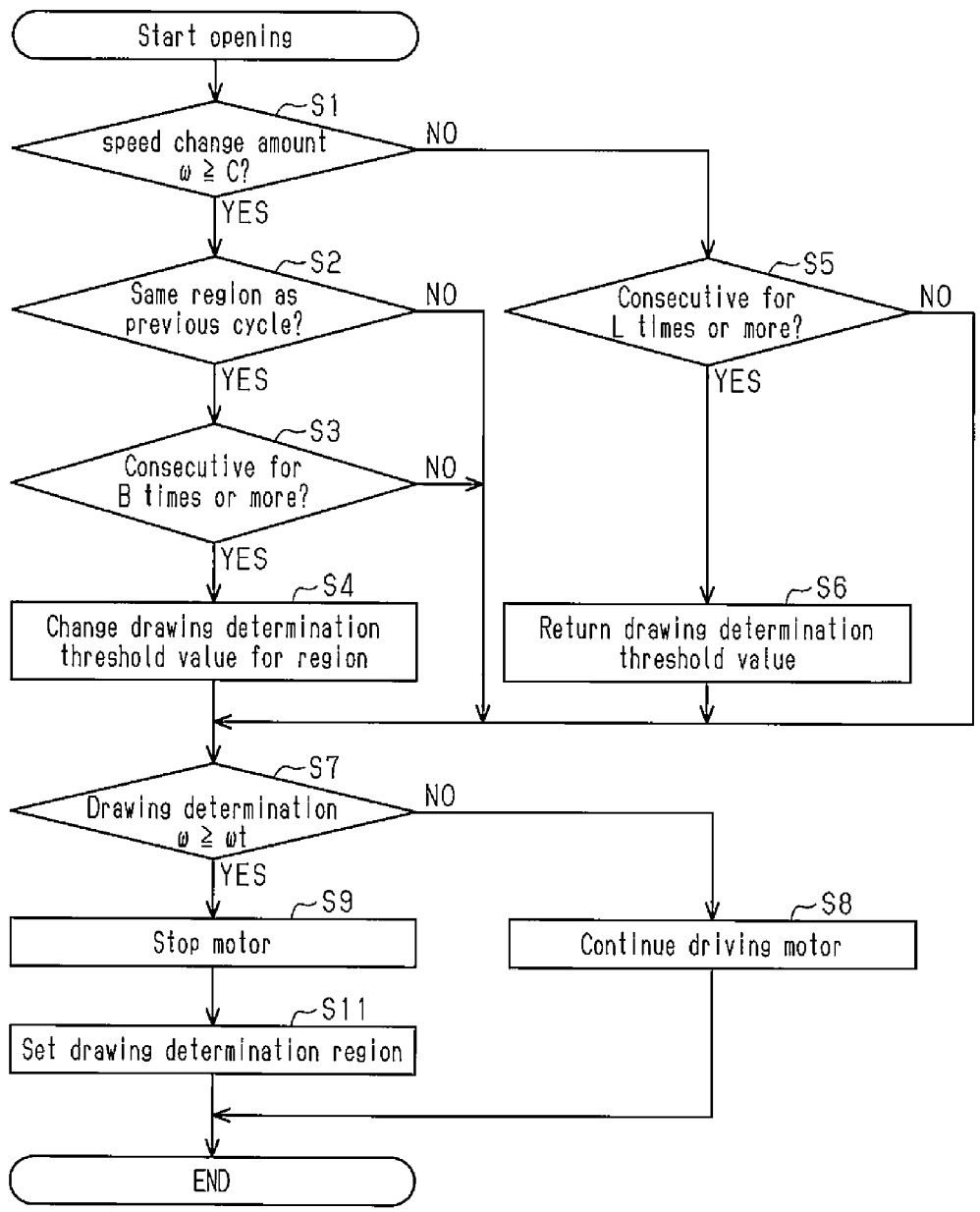
FIG. 11 is a flowchart illustrating the control executed by a power window device in a further example of the fourth embodiment.

In the fourth embodiment, the regions Ar1 to Ar5 are set in advance. Instead, for example, the determination region ArM may be generated whenever necessary to include the position where drawing was determined. As shown in FIG. 11, when the speed change amount $\omega$ is greater than or equal to the drawing determination threshold value $\omega t$ (step S7: YES), the control circuit 21 stops driving the motor 11 (step S9). Then, the control circuit 21 sets the region of a predetermined range in the movement direction of the window glass WG from the position of the window glass WG where drawing was determined (stop position) as the determination region ArM (step S11). Subsequently, the processes from step S1 are sequentially repeated in the same manner as the fourth embodiment.

In such a configuration, there is no need to set a plurality of regions in advance. Thus, there is no need to store a plurality of regions in the memory in advance. This reduces the load on the memory.

In the fourth embodiment, the control circuit 21 uses the speed change amount $\omega$ of the motor 11 to perform foreign matter drawing detection. Instead, for example, drawing detection may be performed using a characteristic value other than the speed change amount $\omega$ of the motor 11 (characteristic value of motor 11 that changes in accordance with a change in the load applied to the window glass WG).

In the fourth embodiment, the control circuit 21 stops driving the motor 11 when determining drawing to stop opening the window glass WG. In addition, for example, the control circuit 21 may reverse the window glass WG by a predetermined amount in the closing direction when determining drawing.

In the fourth embodiment, the present invention is applied to the power window device 10 that uses the X-arm type window regulator. The present invention may also be applied to a power window device that uses a wire-type window regulator or a power window device that uses a single-arm type window regulator.

In the fourth embodiment, the present invention is applied to the power window device 10 that opens and closes the window glass WG of the vehicle door D. Instead, the present invention may be applied to, for example, a sunroof device that opens a roof glass of a vehicle roof.

The fourth embodiment and the modified examples of the fourth embodiment may be combined.

The first to fourth embodiments and the modified examples may be combined.

The invention claimed is:

1. A vehicle window opening device comprising:
a controller configured to control opening and closing of a vehicle window based on a drive force of a motor;
a change detector configured to detect a change in a state of movement of the vehicle window;
a drawing detector configured to detect drawing of a foreign matter by the vehicle window based on a change detected by the change detector; and
an entrapment determination unit, a drawing determination unit, a restriction unit, and a restriction cancellation unit; wherein
the controller is configured to restrict closing of the vehicle window after the drawing detection;
the entrapment determination unit is configured to determine that the vehicle window has entrapped a foreign object when a characteristic value of the motor, which changes in accordance with a change in a load applied to the closing vehicle window, is greater than or equal to a first threshold value;
the drawing determination unit is configured to determine that the vehicle window has drawn in a foreign object when a characteristic value of the motor, which changes in accordance with a change in a load applied to the opening vehicle window, is greater than or equal to a second threshold value;
the controller is configured to execute entrapment prevention control that reverses or stops a closing movement of the vehicle window in response to an entrapment determination of the entrapment determination unit to restrict the closing movement of the vehicle window;
the controller is configured to execute drawing prevention control that reverses or stops an opening movement of the vehicle window in response to a drawing determination of the drawing determination unit;

the restriction unit is configured to restrict the entrapment prevention control after the drawing determination so that the controller does not execute the entrapment prevention control even when the characteristic value of the motor is greater than or equal to the first threshold value when the vehicle window is closing; and the restriction cancellation unit is configured to cancel the restriction of the entrapment prevention control imposed by the restriction unit after the entrapment determination in accordance with at least one of a closing frequency of the vehicle window, a closing movement time, and a closing movement amount.

2. The vehicle window opening device according to claim 1, wherein after the drawing detecting, when an open amount of the vehicle window is less than a limit threshold value, the controller is configured to limit a movement amount when the vehicle window closes as compared to when the open amount of the vehicle window is greater than or equal to the limit threshold value.

3. The vehicle window opening device according to claim 2, further comprising:

an entrapment detector and a restriction unit;

wherein the entrapment detector is configured to detect entrapment of a foreign matter by the vehicle window based on a change detected by the change detector;

the controller is configured to execute entrapment prevention control that reverses or stops a closing movement of the vehicle window based on an entrapment determination resulting from the entrapment detection; and the restriction unit is configured to restrict, after the drawing detection, the entrapment prevention control so that the entrapment prevention control is not executed when the vehicle window is closing.

4. The vehicle window opening device according to claim 3, wherein:

the controller is configured to enable automatic movement of the vehicle window to a fully open position or a fully closed position when a predetermined operation is performed on an operation switch; and the restriction unit is configured to disable automatic closing of the vehicle window when restricting the entrapment prevention control so that entrapment prevention control is not executed.

5. The vehicle window opening device according to claim 1, wherein:

the controller executes movement speed control on the vehicle window to produce a low speed zone in which the vehicle window is moved at a low speed and a high speed zone in which the vehicle window is moved at a higher speed than the low speed; and the controller is configured to control movement of the vehicle window when the vehicle window closes for the first time after the drawing detector detects drawing so that the low speed zone is lengthened as compared to a closing movement when closing the vehicle window without detecting drawing.

6. The vehicle window opening device according to claim 5, wherein:

when the vehicle window closes for the first time after the drawing detector detects drawing, the low speed zone includes a constant speed zone; and the vehicle window is moved in the constant speed zone at a constant speed from at least when the vehicle window starts to close to when a predetermined time elapses.

7. The vehicle window opening device according to claim 6, wherein:

the controller is configured to change an output signal sent to the motor to change a drive speed of the motor and control opening and closing of the vehicle window; and the controller is configured to send an output signal to the motor so that a moving speed of the vehicle window in the constant speed zone is lowest in the low speed zone.

8. The vehicle window opening device according to claim 1, wherein:

the controller is configured to enable automatic movement of the vehicle window to a fully open position or a fully closed position when a predetermined operation is performed on an operation switch; and the restriction unit is configured to disable automatic closing of the vehicle window when the controller restricts execution of the entrapment prevention control.

9. The vehicle window opening device according to claim 1, wherein the restriction cancellation unit is configured to cancel the restriction of the entrapment prevention control imposed by the restriction unit when the vehicle window is located at a fully closed operation.

10. A vehicle window opening device comprising:

a controller configured to control opening and closing of a vehicle window based on a drive force of a motor;

a change detector configured to detect a change in a state of movement of the vehicle window;

a drawing detector configured to detect drawing of a foreign matter by the vehicle window based on a change detected by the change detector; and an entrapment determination unit and a drawing determination unit; wherein the controller is configured to restrict closing of the vehicle window after the drawing detection;

the entrapment determination unit is configured to determine that the vehicle window has entrapped a foreign object when a characteristic value of the motor, which changes in accordance with a change in a load applied to the closing vehicle window, is greater than or equal to an entrapment threshold value;

the drawing determination unit is configured to determine that the vehicle window has drawn in a foreign object when a characteristic value of the motor, which changes in accordance with a change in a load applied to the opening vehicle window, is greater than or equal to a drawing determination threshold value;

the controller is configured to execute entrapment prevention control that reverses or stops a closing movement of the vehicle window in response to an entrapment determination of the entrapment determination unit to restrict the closing movement of the vehicle window;

the controller is configured to execute drawing prevention control that stops or reverses by a predetermined amount an opening movement of the vehicle window in response to a drawing determination of the drawing determination unit;

the drawing determination unit is configured to initially set the drawing determination threshold value to a first value;

the drawing determination unit is configured to set, after a drawing determination, a drawing determination region to a region including where the vehicle window was located when the drawing determination was made; and the drawing determination unit is configured to set the drawing determination threshold value to a second value that is larger than the first value if the characteristic value of the motor in the drawing determination region is consecutively greater than or equal to the first value when the vehicle window opens and passes through the drawing determination region a number of times.

11. The vehicle window opening device according to claim 10, wherein:

a movement region in which the vehicle window opens and closes includes a plurality of set regions that are set in advance in a movement direction;

the drawing determination unit is configured to set the drawing determination region; and the drawing determination region is set to a region, among the plurality of set regions, in which the vehicle window was located when the drawing determination was made.

12. The vehicle window opening device according to claim 10, wherein:

the drawing determination unit is configured to set the drawing determination region after the drawing determination; and the drawing determination region is set to a region extending over a predetermined range in a moving direction of the vehicle window from where the vehicle window was located when a drawing determination was made.

13. The vehicle window opening device according to claim 10, wherein:

the first value is a recovery threshold value; and the drawing determination unit is configured to set the drawing determination threshold value to the first value in the drawing determination region when the characteristic value of the motor is consecutively less than or equal to the recovery threshold value for a predetermined number of times.

14. The vehicle window opening device according to claim 10, wherein:

the drawing determination unit includes a third value serving as a recovery threshold that is smaller than the first value; and the drawing determination unit is configured to set the drawing determination threshold value to the first value in the drawing determination region when the characteristic value of the motor is less than the recovery threshold value in the drawing determination region.

15. A vehicle window opening device comprising:

a controller configured to control opening and closing of a vehicle window based on a drive force of a motor;

a change detector configured to detect a change in a state of movement of the vehicle window;

a drawing detector configured to detect drawing of a foreign matter by the vehicle window based on a change detected by the change detector; and a drawing determination unit and a restriction unit; wherein the controller is configured to restrict closing of the vehicle window after the drawing detection;

the drawing determination unit is configured to determine that the vehicle window has drawn in a foreign object when a characteristic value of the motor, which changes in accordance with a change in a load applied to the opening vehicle window, is greater than or equal to a drawing determination threshold value;

the controller is configured to disable automatic closing of the vehicle window in response to a drawing determination of the drawing determination unit to restrict closing of the vehicle window;

the controller is configured to execute drawing prevention control that stops or reverses by a predetermined amount an opening movement of the vehicle window in response to a drawing determination of the drawing determination unit;

the restriction unit is configured to set, after a drawing determination is made by the drawing determination unit, a drawing determination region to a region including where the vehicle windows was located when the drawing determination was made; and the restriction unit is configured to restrict the controller from executing the drawing prevention control when a drawing determination is consecutively made in the drawing determination region as the vehicle window opens and passes through the drawing determination region a number of times.

* * * * *